United States Patent
Roth et al.

(10) Patent No.: US 9,854,001 B1
(45) Date of Patent: Dec. 26, 2017

(54) TRANSPARENT POLICIES

(71) Applicant: Amazon Technologies, Inc., Reno, NV (US)

(72) Inventors: Gregory Branchek Roth, Seattle, WA (US); Eric Jason Brandwine, Haymarket, VA (US)

(73) Assignee: Amazon Technologies, Inc., Seattle, WA (US)

(*) Notice: Subject to any disclaimer, the term of this patent is extended or adjusted under 35 U.S.C. 154(b) by 435 days.

(21) Appl. No.: 14/225,300

(22) Filed: Mar. 25, 2014

(51) Int. Cl.
*H04L 29/06* (2006.01)

(52) U.S. Cl.
CPC .................. *H04L 63/20* (2013.01)

(58) Field of Classification Search
CPC ..................................... H04L 63/20
USPC ............................................ 726/1
See application file for complete search history.

(56) References Cited

U.S. PATENT DOCUMENTS

| | | | |
|---|---|---|---|
| 6,084,969 A | 7/2000 | Wright et al. | |
| 6,367,013 B1 | 4/2002 | Bisbee et al. | |
| 6,978,367 B1 * | 12/2005 | Hind | G06F 21/577 380/273 |
| 7,299,277 B1 * | 11/2007 | Moran | H04L 41/5022 370/230 |
| 7,587,755 B2 * | 9/2009 | Kramer | G06F 21/52 707/999.009 |
| 7,590,705 B2 * | 9/2009 | Mathew | G06Q 30/02 709/217 |
| 7,757,276 B1 | 7/2010 | Lear | |
| 7,770,220 B2 * | 8/2010 | Fernstrom | G06F 17/30011 726/18 |
| 7,821,926 B2 * | 10/2010 | Hannel | H04L 63/0218 370/229 |
| 8,020,190 B2 * | 9/2011 | Plummer | H04L 67/02 713/165 |
| 8,468,577 B1 * | 6/2013 | Pooley | G06F 21/604 726/1 |
| 8,688,734 B1 * | 4/2014 | Tidd | G06F 17/30165 707/783 |
| 8,769,642 B1 * | 7/2014 | O'Neill | H04L 63/10 726/1 |
| 8,850,010 B1 * | 9/2014 | Qureshi | H04L 41/0816 709/225 |
| 8,856,865 B1 * | 10/2014 | Martini | H04L 63/20 709/223 |
| 9,015,857 B2 * | 4/2015 | Sprague | G06F 21/60 726/26 |
| 2001/0002485 A1 | 5/2001 | Bisbee et al. | |

(Continued)

OTHER PUBLICATIONS

Microsoft Computer Dictionary, "microprocessor", 2002.*

(Continued)

*Primary Examiner* — O. C. Vostal
(74) *Attorney, Agent, or Firm* — Davis Wright Tremaine LLP

(57) ABSTRACT

A system enforces policies in connection with requests to access resources. Users are provided the ability to obtain information about the policies the system enforces. Some of the users have associated restrictions such that, when those users request information about the policies, the information provided is incomplete. The information provided may lack information about one or more policies that apply to the users.

22 Claims, 15 Drawing Sheets

(56) References Cited

U.S. PATENT DOCUMENTS

| | | | |
|---|---|---|---|
| 2002/0133579 A1* | 9/2002 | Bernhardt | G06Q 10/06 709/223 |
| 2002/0147801 A1* | 10/2002 | Gullotta | G06F 21/6218 709/223 |
| 2002/0169876 A1* | 11/2002 | Curie | G06Q 10/06 709/226 |
| 2003/0093302 A1* | 5/2003 | Quido | G06Q 40/02 705/4 |
| 2003/0110262 A1* | 6/2003 | Hasan | H04L 41/0213 709/226 |
| 2003/0229522 A1* | 12/2003 | Thompson | G06Q 10/067 705/4 |
| 2004/0088579 A1* | 5/2004 | Powers | H04L 63/104 726/4 |
| 2005/0097199 A1* | 5/2005 | Woodard | H04L 67/125 709/223 |
| 2005/0229236 A1* | 10/2005 | Devgan | G06F 21/6218 726/1 |
| 2006/0039364 A1* | 2/2006 | Wright | H04L 41/0893 370/352 |
| 2006/0041931 A1* | 2/2006 | Boxall | H04L 41/082 726/4 |
| 2007/0294312 A1* | 12/2007 | Seshadri | G06F 9/44505 |
| 2007/0300300 A1* | 12/2007 | Guo | G06F 21/552 726/23 |
| 2008/0148344 A1* | 6/2008 | Rubio | G06F 21/31 726/1 |
| 2008/0155651 A1* | 6/2008 | Wasmund | G06F 21/316 726/2 |
| 2008/0184330 A1* | 7/2008 | Lal | G06F 21/31 726/1 |
| 2008/0229428 A1* | 9/2008 | Camiel | G06F 17/30082 726/27 |
| 2008/0282314 A1* | 11/2008 | Abzarian | H04L 63/20 726/1 |
| 2009/0327909 A1* | 12/2009 | Hayton | G06F 21/6218 715/744 |
| 2010/0023519 A1* | 1/2010 | Kailash | H04L 63/10 707/E17.007 |
| 2010/0332845 A1 | 12/2010 | Asaka | |
| 2011/0023085 A1* | 1/2011 | Inoue | H04L 63/102 726/1 |
| 2011/0118557 A1* | 5/2011 | McKenna | A61B 5/145 600/300 |
| 2011/0145593 A1* | 6/2011 | Auradkar | G06F 21/6218 713/189 |
| 2012/0054120 A1* | 3/2012 | Hjelm | G06Q 30/0282 705/347 |
| 2012/0278851 A1* | 11/2012 | Dan | H04L 41/0893 726/1 |
| 2013/0091544 A1* | 4/2013 | Oberheide | G06F 21/45 726/1 |
| 2013/0097653 A1* | 4/2013 | Naor | G06F 3/0613 726/1 |
| 2013/0097657 A1* | 4/2013 | Cardamore | H04W 12/08 726/1 |
| 2013/0191631 A1* | 7/2013 | Ylonen | H04L 63/1483 713/153 |
| 2013/0205365 A1* | 8/2013 | Choi | G06F 21/57 726/1 |
| 2013/0218931 A1* | 8/2013 | Lewis | G06F 17/30289 707/803 |
| 2013/0246639 A1* | 9/2013 | Nedbal | H04L 63/101 709/228 |
| 2013/0310166 A1* | 11/2013 | Higgins | G06F 21/41 463/29 |
| 2013/0347055 A1* | 12/2013 | Motoyama | G06F 21/00 726/1 |
| 2014/0032599 A1* | 1/2014 | Herbach | G06F 21/604 707/781 |
| 2014/0038547 A1* | 2/2014 | Mo | H04L 12/1407 455/406 |
| 2014/0164052 A1* | 6/2014 | Pesci-Anderson | G06Q 40/08 705/7.28 |
| 2014/0181285 A1* | 6/2014 | Stevens | H04L 67/322 709/223 |
| 2014/0245015 A1* | 8/2014 | Velamoor | H04L 63/061 713/171 |
| 2014/0281559 A1* | 9/2014 | Trachtenberg | H04L 63/0457 713/178 |
| 2014/0343989 A1* | 11/2014 | Martini | G06Q 10/063118 705/7.17 |
| 2015/0143453 A1* | 5/2015 | Erb | H04L 63/102 726/1 |
| 2015/0256404 A1* | 9/2015 | Evans | H04L 67/16 709/224 |
| 2015/0304736 A1* | 10/2015 | Lal | G06F 21/10 380/210 |
| 2015/0312872 A1* | 10/2015 | Liang | G07C 1/10 455/435.1 |

OTHER PUBLICATIONS

Heyes, "Implementing Environmental Regulation Enforcement and Compliance", 2000.*
USPTO, "2014 Interim Eligibility Guidance Quick Reference Sheet", 2014.*
USPTO, "2014 Interim Eligibility Guidance on Patent Subject Matter Eligibility", 2015.*
BusinessDictionary, "granularity", 2017.*
Merriam-Webster, "granular", 2017.*
Hagimont, "Protection in the Guide Object-Oriented Distributed System", 2006.*
Hagimont et al., "Protection in an Object-Oriented Distributed Virtual Machine", 1992.*
Mar-Elia, "Bulletproof Your Windows Network with Group Policy", 2004.*
NetIQ, "NetIQ Directory & Resource Administrator", 2017.*
Pardal et al., "Access Control Polcies for Traceability Information Systems", 2014.*
TPM Main, Part 1 Design Principles, Specification Version 1.2, Level 2 Revision 103, Jul. 9, 2007, Published.
TPM Main, Part 2 TPM Structures, Specification Version 1.2, Level 2 Revision 103, Jul. 9, 2007, Published.
TPM Main, Part 3 Commands, Specification Version 1.2, Level 2 Revision 103, Jul. 9, 2007, Published.
TPM Main, Part 1 Design Principles, Specification Version 1.2, Revision 116, Mar. 1, 2011, TCG Published.
TPM Main, Part 2 TPM Structures, Specification Version 1.2, Level 2 Revision 116, Mar. 1, 2011 TCG Published.
TPM Main, Part 3 Commands, Specification Version 1.2, Level 2 Revision 116, Mar. 1, 2011, TCG Published.
International Standard ISO/IEC 11889-1, First Edition May 15, 2009, Information Technology—Trusted Platform Module—Part 1: Overview.
International Standard ISO/IEC 11889-1, First Edition May 15, 2009, Information Technology—Trusted Platform Module Part 2: Design Principles.
International Standard ISO/IEC 11889-1, First Edition May 15, 2009, Information Technology—Trusted Platform Module—Part 3: Structures.
International Standard ISO/IEC 11889-1, First Edition May 15, 2009, Information Technology—Trusted Platform Module—Part 4: Commands.
U.S. Appl. No. 14/225,249, filed Mar. 25, 2014.

* cited by examiner

TRANSPARENT POLICIES

CROSS-REFERENCE TO RELATED APPLICATIONS

This application incorporates by reference for all purposes the full disclosure of co-pending U.S. patent application Ser. No. 14/225,249, filed concurrently herewith, entitled "TRUSTED-CODE GENERATED REQUESTS".

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

In many instances, administrators and other users of an organization's computing resources have great control over those resources. The amount of computing resource access they have can create issues. For example, while most users are diligent and trustful employees, there is the possibility that a user can utilize computing resources for harmful purposes, whether intentionally or unintentionally remains. Many attempts to prevent harm to an organization through use of its computing resources include making use of logs that record actions users take when using company resources. However, for users with access to activities being logged, those users have the ability to avoid detection with careful planning.

BRIEF DESCRIPTION OF THE DRAWINGS

Various embodiments in accordance with the present disclosure will be described with reference to the drawings, in which.

DETAILED DESCRIPTION

Figure 1:
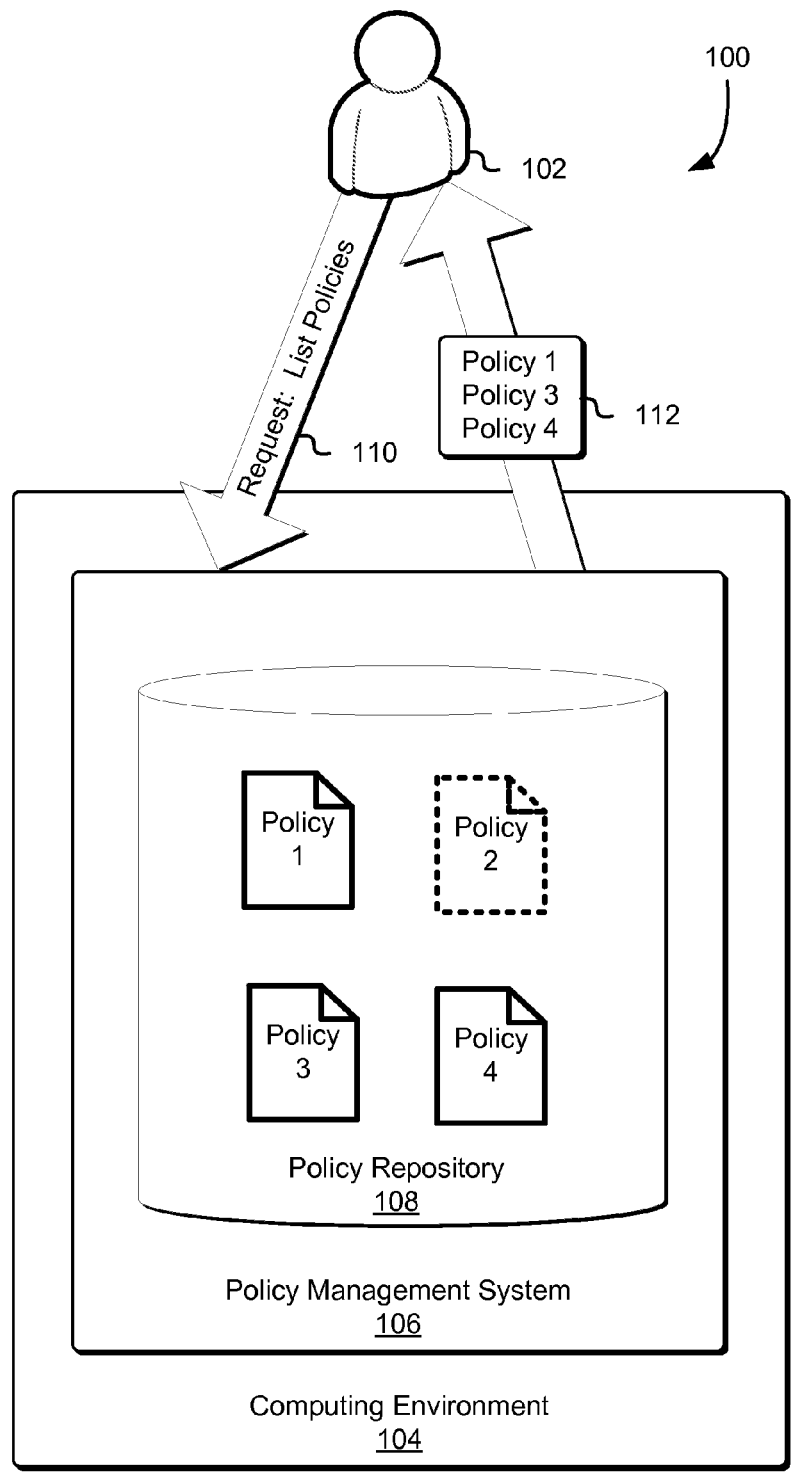
FIG. 1 shows a diagram illustrating various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein enable the control over visibility to policies in a system that enforces the policies as part of its access control. In an embodiment, a computing environment maintains policies that, when applicable to requests for access to computing resources are evaluated to determine whether to fulfill the requests. In some examples, the policies are maintained by a service provider (e.g., computing resource service provider, as discussed in more detail below) that maintains a plurality of customer accounts. One or more may be maintained for each of at least some of the customers to control access to resources hosted by the service provider on behalf of the customers.

In some embodiments, users of a customer account (who may have sub-accounts with the service provider) are able to author policies using a suitable structured format, such as described in more detail below. A customer may specify parameters for a policy to create a policy document that may be transmitted in an application programming interface (API) call which, in some embodiments, is a web service API call, to the service provider. The customer may author a policy in various ways, such as through a graphical user interface with user interface components (e.g., text entry fields, menus and the like) for specifying the parameters of a policy. In some examples, policies may be authored in a suitable policy language by directly composing the policy with a text editor. Other actions in connection with the management of policy may also be performed through the use of appropriate API calls to the service provider. For example, a user may submit an API call to list policies of an account associated with the user, another API call to obtain details of a particular policy, another API call to activate or inactivate a particular policy, and the like.

In some embodiments, policies may be generated in different ways to achieve different types of policy visibility. For example, some policies may be generated with associated restrictions regarding who can view the policies and/or their existence. As an example, an account of a service provider may have a set of policies associated with the account where the set includes a policy with a visibility restriction. For some users, in accordance with the visibility restriction, an API call to list the policies of the account may exclude the policy with the visibility restriction from the list. In other words, the system does not provide any information that indicates the existence of the policy with the visibility restriction; thereby prevent such users from knowing that the policy may be triggered by their actions. For other users, who are permitted or not prohibited by the visibility restriction to view (i.e., obtain) information indicating the policy and/or its existence, an API call to list the policies may include the policy with the visibility restriction.

Policies with visibility restrictions may be used in various ways to achieve various results. As discussed in more detail below, policies may have associated actions that are taken when a policy applies. The use of policies with visibility restrictions may be used to prevent users from obtaining information and thereby becoming notified that such actions are being taken. For example, policies may be configured such that, when triggered by a request, the request is logged. In this manner, users who are unable to obtain information indicating the existence of a policy that results in logging are unaware of certain types of requests that will be logged. Other example actions include transmission of notifications (e.g., in the form of electronic messages), sounding of alarms, denial of requests, transmission of preconfigured API calls to invoke customer actions, log reconciliations and the like. However, in some embodiments, some actions (e.g., denial of requests) are not allowed for policies with visibility restrictions due to the ability of a user to detect the policy as a result of a request being denied. In some embodiments, false responses may be provided in response to requests. As an example, if a request is to read data specified in the request (e.g., by an identifier of the data), different data than the data identified in the request may be provided in response to the request. Generally, when requests to which policies with visibility restrictions apply are received, responses to the requests may be provided where the responses lack indicia that the requests were denied but where the requests were, in fact, denied. In such embodiments, a system may be configured to operate as if a request was fulfilled even when the request was, in fact, denied.

In various embodiments, policies may be configured (either automatically or at the direction of a user) such that the results of policies with visibility restrictions being triggered are not detectable by those users unable to obtain information about the policies' existence. For example, audit logs entries and/or entire logs may be encrypted using a public key of a public-private key pair for which the private key is inaccessible to those unable to obtain information about the policies' existence. Further, the existence of logs, log entries, or other information recorded as a result of policies with visibility restriction being triggered by requests may similarly be undetectable by those users unable to obtain information about the policies' existence. For example, API calls to obtain and/or list logs may exclude entries and/or logs containing information recording requests that triggered policies with associated visibility restrictions. Other variations, including those discussed in more detail below are also considered as being within the scope of the present disclosure.

FIG. 1 shows an illustrative example of an environment 100 in which various embodiments may be practiced. In this illustrative example, the environment 100 includes a user 102 that communicates with a computing environment 104.

In some examples, the computing environment 104 comprises a plurality of computing devices managed by and operated by a computing resource service provider such as described in more detail below. However, the computing environment 104 may be another computing environment, such as an enterprise computing environment, and generally any computing environment in which policies are used for the purpose of managing what users are able to accomplish. The user 102 may communicate with the computing environment through a suitable computing device, such as a computing device listed below. For example, the user 102 may utilize a computing device to transmit communications over a network such as the internet to the computing environment 104, and a computing environment 104 may include suitable devices for receiving and processing such communications such as web servers and networking equipment operating in connection with the web servers.

In an embodiment, the computing environment 104 includes a policy management system 106 which may comprise a collection of computing resources such as servers, networking equipment, and other computing resources that are collectively configured to manage policies. An example policy management system is described in more detail below, although the techniques of the present disclosure are applicable to other policy management systems. As illustrated in FIG. 1, in some embodiments, the policy management system 106 includes a policy repository 108 used to store a plurality of policies. The policy repository 108 may comprise one or more data storage systems having data storage devices that persistently store policies for use by the policy management system and otherwise for the enforcement of policy in connection with the computing environment 104. In this example, the policy repository 108 stores four policies identified in the figure as Policy 1, Policy 2, Policy 3 and Policy 4 in addition to possibly other policies not illustrated in the figure. It should be noted that policy repositories in accordance with various embodiments may store many more policies than are illustrated in the figure. Further, while FIG. 1 shows policies stored in a single policy repository, the policy management system may include numerous policy repositories and the policies may be distributed among the multiple policy repositories.

As illustrated in FIG. 1, policies stored in the policy repository 108 may have different types. In this example, there are at least two types of policies. For example, policies in FIG. 1 illustrated with a solid line border—namely Policy 1, Policy 3 and Policy 4—are policies without visibility restrictions. A policy with a dashed line border—namely Policy 2—is a policy with a visibility restriction, where a visibility restriction is a restriction on which users are able to obtain certain information about the existence of the policy. As noted below, such a policy may be referred to as a "transparent policy." While FIG. 1 and other embodiments described explicitly here and illustrate various techniques of the present disclosure in connection with two types of policies—that is, policies with and without visibility restrictions—the techniques described herein are applicable to embodiments where there may be multiple types of policies such as policies with different types of visibility restrictions. Some policies, for example, may have a first visibility restriction, while other policies may have another visibility restriction that is different.

As illustrated in FIG. 1, the user 102, in some embodiments, is able to transmit (i.e., cause the user's device to transmit or another system (e.g., remote server) to transmit) an application programming interface (API) call 110 to the policy management system 106. The user 102, for example, may be an employee of the customer of the computing resource service provider. The user may be an administrator or other user authorized to manage policies of the customer. In this example, the API call 110 is a request to list policies of an account associated with the user 102 although the techniques of the present disclosure extend to other types of API calls configured to cause a response containing information about policies of a policy management system. In embodiments where the computing environment 104 is a computing environment of a computing resource service provider, the API call 110 may be a request to list policies of a customer of the computing resource service provider where the user 102 submits the request on behalf of the customer. The API call may specify all policies or may provide parameters to specify conditions that define a subset of policies, such as all policies submitted by a particular user, all policies applicable to a particular service, all policies submitted in a particular time period and other conditions, which may be complex conditions based on multiple sub-conditions.

The policy management system 106 may receive the API call, for example, by a web server in embodiments where the API call is in the form of the web service request. Assuming that the user 102 is authorized to have such a request fulfilled, the policy management system 106 may determine a response to the request and transmit the response 112 to the user 102, such as in the form of a web service response to a computing device of the user 102. In this illustrative example, a visibility restriction on Policy 2 prevents the user 102 from obtaining information about the existence of Policy 2. Accordingly, the response 112 provided to the user 102 lists (e.g., provides identifiers for) Policy 1, Policy 3 and Policy 4, but omits (e.g., lacks an identifier for) Policy 2. In addition, in this example and in various embodiments, the response 112 lacks an indication of the omission of Policy 2. In this manner, the user 102, by requesting a list of the policies, is unable to detect the existence of Policy 2 through an API call to list policies. Policy 2 may, for example, be a policy that applies to actions of the user 102 and a visibility restriction on Policy 2 may be applicable to the user 102 to prevent the user 102 from learning of the existence of Policy 2, and if so inclined, attempting to circumvent application of Policy 2.

While not illustrated in FIG. 1, it should be noted that, for other users, the same API call 110 may result in a response that indicates the existence of Policy 2, such as by including an identifier of Policy 2 in a list of policies. Such users may be, for example, users having appropriate authorization for creating Policy 2 and causing Policy 2 to be enforced. In some examples, for instance, the user 102 illustrated in FIG. 1 may be an administrator of the computing environment 104 or a portion thereof. As an example, the user 102 may be an administrator of a customer account, and Policy 2 may have been placed by another user into the policy repository 108 by another user whose responsibility includes monitoring actions of user 102.

Figure 2:
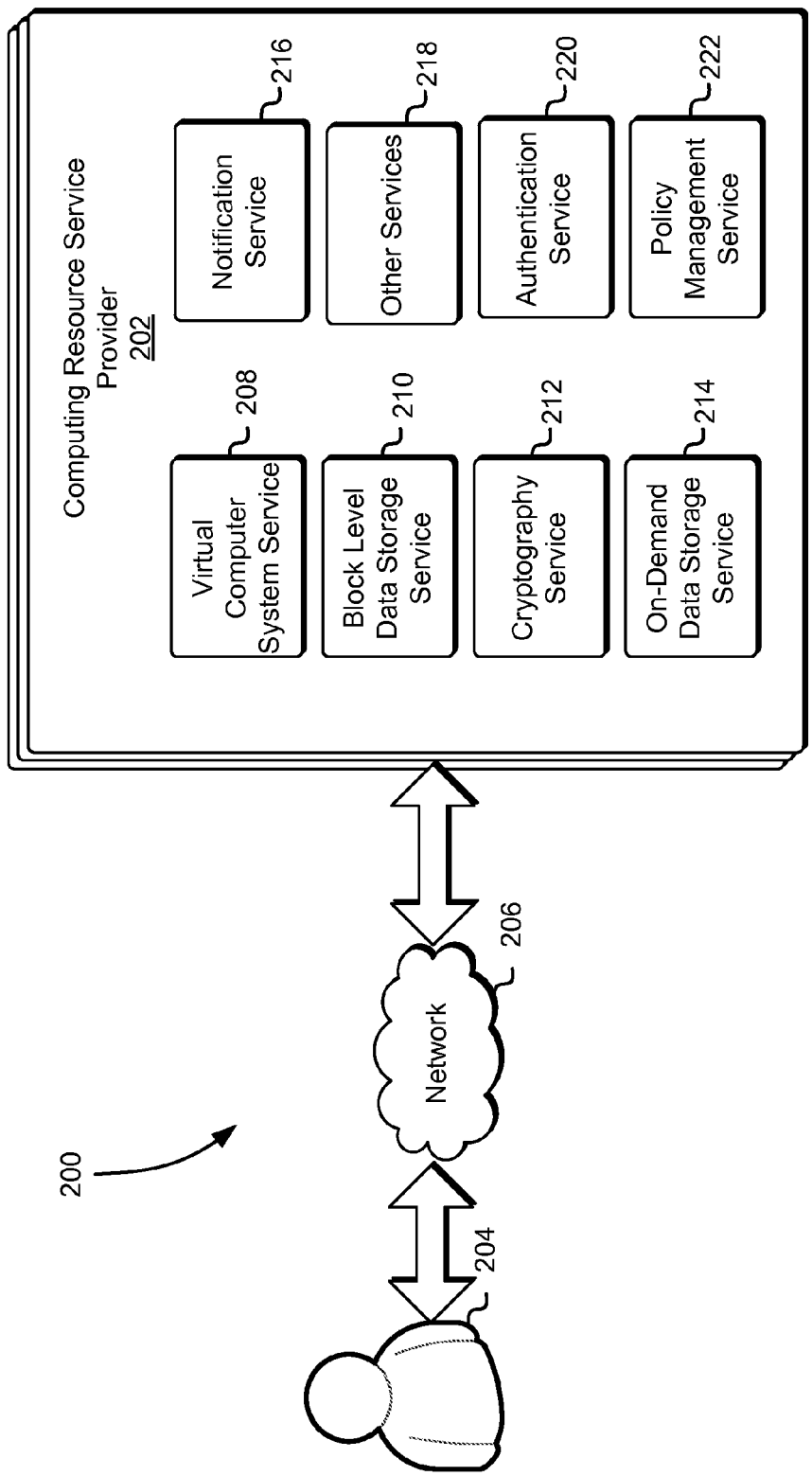
FIG. 2 shows an illustrative example of an environment in which various embodiments can be practiced.

FIG. 2 shows an illustrated example of an environment 200 in which various embodiments of the present disclosure may be practiced. In the environment 200, a computing resource service provider 202 may provide a variety of services to a customer 204. The customer 204 may be an organization that may utilize the various services provided by the computing resource service provider 202 to maintain and deliver information to its employees, which may be located in various geographical locations. Additionally, the customer 204 may be an individual that could utilize the various services to deliver content to a working group located remotely. As illustrated in FIG. 2, the customer 204 may communicate with the computing resource service provider 202 through one or more communications networks 206, such as the Internet. Some communications from the customer 204 to the computing resource service provider 202 may cause the computing resource service provider 202 to operate in accordance with various techniques described herein or variations thereof.

As noted above, a computing resource service provider 202 may provide various computing resource services to its customers. The services provided by the computing resource service provider, in this example, include a virtual computer system service 208, a block-level data storage service 210, a cryptography service 212 (also referred to as a key management service), an on-demand data storage service 214 and one or more other services 216, although not all embodiments of the present disclosure will include all such services and additional services may be provided in addition to or as an alternative to services explicitly described herein. Each of the services may include one or more web service interfaces that enable the customer 204 to submit appropriately configured API calls to the various services through web service requests. In addition, each of the services may include one or more service interfaces that enable the services to access each other (e.g., to enable a virtual computer system of the virtual computer system service 208 to store data in or retrieve data from the on-demand data storage service and/or to access one or more block-level data storage devices provided by the block data storage service). In some embodiments, the customers and services utilize the same interface to submit requests to a service.

The virtual computer system service 208 may be a collection of computing resources (e.g., collection of devices) configured to instantiate virtual machine instances onto virtual computing systems on behalf of the customers 204 of the computing resource service provider 202. Customers 204 of the computing resource service provider 202 may interact with the virtual computer systems' service (via appropriately configured and authenticated API calls) to provision and operate virtual computer systems that are instantiated on physical computing devices hosted and operated by the computing resource service provider 202. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications.

The block-level data storage service 210 may comprise a collection of computing resources that collectively operate to store data for a customer 204 using block-level storage devices (and/or virtualizations thereof). The block-level storage devices of the block-level data storage service 210 may, for instance, be operationally attached to virtual computer systems provided by the virtual computer system service 208 to serve as logical units (e.g., virtual drives) for the computer systems. A block-level storage device may enable the persistent storage of data used/generated by a corresponding virtual computer system where the virtual computer system service 208 may only provide ephemeral data storage.

As illustrated in FIG. 2, the computing resource service provider 202 may operate a cryptography service 212, which is described in more detail below in connection with FIG. 3. Generally, the cryptography service may be a collection of computing resources collectively configured to manage and use cryptographic keys for customers of the computing resource service provider. Keys used by the cryptography service 212 may have associated identifiers that the customers can reference when submitting requests to perform cryptographic operations (such as encryption, decryption and/or message signing) and/or other operations, such as key rotation. The cryptography service may securely maintain the cryptographic keys to avoid access by unauthorized parties. Customers and/or other services of the computing resource service provider may specify, using key identifiers, keys to be used in performing cryptographic operations. Further, the cryptography service 212 may perform cryptographic operations using an implicitly defined (e.g., default) key for a customer and/or service. As an example, a data storage service may submit requests to the cryptography service 212 to encrypt encryption keys used to encrypt data stored by the data storage service and the cryptography service 212 may use a default master key for the data storage service.

The computing resource service provider 202 may also include an on-demand data storage service. The on-demand data storage service 214 may be a collection of computing resources configured to synchronously process requests to store and/or access data. The on-demand data storage service 214 may operate using computing resources (e.g., databases) that enable the on-demand data storage service 214 to locate and retrieve data quickly, so as to allow data to be provided in responses to requests for the data. For example, the on-demand data storage service may maintain stored data in a manner such that, when a request for a data object is retrieved, the data object can be provided (or streaming of the data object can be initiated) in a response to the request. As noted, data stored in the on-demand data storage service 214 may be organized into data objects. The data objects may have arbitrary sizes except, perhaps, for certain constraints on size. Thus, the on-demand data storage service 214 may store numerous data objects of varying sizes. The on-demand data storage service 214 may operate as a key value store that associates data objects with identifiers of the data objects which may be used by the customer 204 to retrieve or perform other operations in connection with the data objects stored by the on-demand data storage service 214. The on-demand data storage service 214 may also be accessible to the cryptography service 212. For instance, in some embodiments, the cryptography service utilizes the on-demand data storage service to store keys of the customers in encrypted form, where keys usable to decrypt the customer keys are accessible only to particular devices of the cryptography service 212. Access to the data storage service by a customer, another service, or other entity may be through appropriately configured API calls.

In the environment illustrated in FIG. 2, a notification service 216 is included. The notification service 216 may comprise a collection of computing resources collectively configured to provide a web service or other interface and browser-based management console that can be used to create topics customers want to notify applications (or people) about, subscribe clients to these topics, publish messages, and have these messages delivered over clients' protocol of choice (i.e., HTTP, email, SMS, etc.). The notification service may provide notifications to clients using a "push" mechanism without the need to periodically check or "poll" for new information and updates. The notification service may be used for various purposes such as monitoring applications executing in the virtual computer system service, workflow systems, time-sensitive information updates, mobile applications, and many others.

The computing resource service provider 202 may additionally maintain one or more other services 218 based on the needs of its customers 204. For instance, the computing resource service provider 202 may maintain a database service for its customers 204. A database service may be a collection of computing resources that collectively operate to run one or more databases for one or more customers 204. Customers 204 of the computing resource service provider 202 may operate and manage a database from the database service by utilizing appropriately configured API calls. This, in turn, may allow a customer 204 to maintain and potentially scale the operations in the database. Other services include, but are not limited to, object-level archival data storage services, services that manage and/or monitor other services and/or other services.

As illustrated in FIG. 2, the computing resource service provider 202, in various embodiments, includes an authentication service 220 and a policy management service 222. The authentication service, in an embodiment, is a computer system (i.e., collection of computing resources) configured to perform operations involved in authentication of users of the customer. For instance, one of the services may provide information from the users to the authentication service to receive information in return that indicates whether or not the user requests are authentic. Determining whether user requests are authentic may be performed in any suitable manner and the manner in which authentication is performed may vary among the various embodiments. For example, in some embodiments, users electronically sign messages (i.e., computer systems operated by the users electronically sign messages) that are transmitted to a service. Electronic signatures may be generated using secret information (e.g., a private key of a key pair associated with a user) that is available to both an authenticating entity (e.g., user) and the authentication service. The request and signatures for the request may be provided to the authentication service which may, using the secret information, compute a reference signature for comparison with the received signature to determine whether the request is authentic. Message verification may also be performed using asynchronous cryptography and the keys used by the various parties may be selected accordingly.

If the request is authentic, the authentication service may provide information to the service that the service can use to determine whether to fulfill a pending request and/or to perform other actions, such as prove to other services, such as the cryptography service, that the request is authentic, thereby enabling the other services to operate accordingly. For example, the authentication service may provide a token that another service can analyze to verify the authenticity of the request. Electronic signatures and/or tokens may have validity that is limited in various ways. For example, electronic signatures and/or tokens may be valid for certain amounts of time. In one example, electronic signatures and/or tokens are generated based at least in part on a function (e.g., a Hash-based Message Authentication Code) that takes as input a timestamp, which is included with the electronic signatures and/or tokens for verification. An entity verifying a submitted electronic signature and/or token may check that a received timestamp is sufficiently current (e.g., within a predetermined amount of time from a current time) and generate a reference signature/token using for the received timestamp. If the timestamp used to generate the submitted electronic signature/token is not sufficiently current and/or the submitted signature/token and reference signature/token do not match, authentication may fail. In this manner, if an electronic signature is compromised, it would only be valid for a short amount of time, thereby limiting potential harm caused by the compromise. It should be noted that other ways of verifying authenticity are also considered as being within the scope of the present disclosure.

The policy management service 222, in an embodiment, is a computer system configured to manage policies on behalf of customers of the computing resource service provider. The policy management service 222 may include an interface that enables customers to submit requests related to the management of policy. Such requests may, for instance, be requests to add, delete, change or otherwise modify policy for the customer or for other administrative actions, such as providing an inventory of existing policies and the like. The policy management service 222 may also interface with other services to enable the services to determine whether the fulfillment of a pending request is allowable according to policy corresponding to the customer for which the request was made. For example, when a service receives a request, the service (if it has not locally cached such information) may transmit information about the request (and/or the request itself) to the policy management system which may analyze policies for the customer to determine whether existing policy of the customer allows fulfillment of the request and provide information to the service according to the determination.

It should be noted that, as with all embodiments explicitly illustrated herein, variations are considered as being within the scope of the present disclosure. For example, some or all operations performed by the authentication service 220 and policy management service 222 may be combined into a single service. A single service may, for example, receive requests to verify pending customer requests and, as part of verifying pending customer requests, may determine whether electronic signatures are valid and whether any applicable policies prevent fulfillment of the request (or whether any applicable policies allow fulfillment of the request where such is required for fulfillment). Further, one or more operations performed by the authentication service 220 and/or the policy management service 222 may be performed by other services themselves without communication with the authentication service 220 or policy management service 222. Services may, for instance, have their own authentication and/or policy evaluation engines, where the authentication and/or policy evaluation engines may be updated by a central authentication service 220 and/or policy management service 222.

As discussed above, various embodiments of the present disclosure are directed to providing cryptography services. Cryptography services may be provided by a cryptography service system such as described above. FIG. 3 accordingly shows an illustrative example of a cryptography service 300 in accordance with various embodiments. As illustrated in FIG. 3 and as discussed above, the cryptography service 300 is logically comprised of a frontend system and a backend system. Both the frontend system and the backend system may be implemented by one or more computer systems configured to perform operations described herein. For example, as illustrated in FIG. 3, the frontend system of the cryptography service 300 implements a request API and a policy configuration API. The request API, in an embodiment, is an API configured for requesting cryptographic and other operations to be performed by the cryptography service. Thus, requests may be made to the frontend system via the request API in order for such cryptographic operations to be performed by the cryptography service.

The request API may be configured with the following example, high-level, requests available:
CreateKey(KeyID)
Encrypt(KeyID, Data, [AAD])
Decrypt(KeyID, Ciphertext, [AAD])
Shred(KeyID)
ReKey(Ciphertext, OldKeyID, NewKeyID).

A CreateKey(KeyID) request, in an embodiment, causes the cryptography service to create a key identified by the KeyID identified in the request. Upon receipt of a request, the cryptography service may generate a key and associate the key with the KeyID. It should be known that KeyID's may be, but are not necessarily unique identifiers. For instance, a KeyID may identify a family of keys. For example, in some embodiments, key rotation is performed. Key rotation may involve replacing keys with other keys to prevent collection of enough decrypted data to allow practical cracking of a cipher used. If performed at the direction of an entity different from the cryptography service, use of the CreateKey(KeyID) request may cause the cryptography service to create a new key to replace an old key identified by the KeyID. The old key may remain identified by the KeyID, but may, for instance, be only used for decryption (of data that has already been encrypted using the old key) and not for future encryption. As another example, in some embodiments, users of the cryptography service provide their own key identifiers and there is a possibility that two different customers may provide the same identifier. In such instances, the identifier may not uniquely identify a key or even uniquely identify a family of keys. Various measures may be in place to address this. For example, an identity or other information associated with a user of the cryptography service may be used to identify the proper key or family of keys. In still other embodiments the cryptographic service may assign a KeyID randomly, sequentially, or using any other method.

It should be noted that, when a KeyID does not uniquely identify a key, various systems may be in place to enable proper functionality. For example, in various embodiments, a family of keys identified by a KeyID is finite. If a decryption operation using a key identified by a KeyID is requested, additional data (e.g., a time stamp of when the encryption was performed) may enable determining the proper key to use. In some embodiments, ciphertexts may include information indicating a key version. In some embodiments, all possible keys are used to provide different decryptions of the data. Since there are a finite number of keys, the proper decryption may be selected from those provided. In some embodiments, decryption with a key is performed in a manner that enables the cryptographic service to detect that the ciphertext was not generated based at least in part on the key, such as by using authenticated encryption. Other variations are also considered as being within the scope of the present disclosure.

An Encrypt(KeyID, Data, [AAD]) request may be used to cause the cryptography service to encrypt the specified data using a key identified by the KeyID. Additional Authenticated Data (AAD) may be used for various purposes and may be data that is not necessarily encrypted, but that is authenticated, e.g., by an electronic signature, a message authentication code or, generally, a keyed hash value included with the AAD. In some embodiments, the ciphertext is generated including at least a portion of the AAD. In some other embodiments the AAD is provided separately during decryption. In some other embodiments, the AAD is generated at decryption time based at least in part on the request and or other metadata such that decryption will only succeed when the metadata passes. In some embodiments, policy may constrain whether a cryptographic operation can be performed with respect to particular AAD. Processing of Encrypt(KeyID, Data, [AAD]) requests may require, by programming logic and/or policy enforced by the cryptography service, both that the AAD contain particular values and that the AAD be authentic (e.g., not modified since original transmission). Similarly, a Decrypt(KeyID, Ciphertext, [AAD]) request may be used to cause the cryptography service to decrypt the specified ciphertext using a key identified by the KeyID. The AAD in the Decrypt(KeyID, Ciphertext, [AAD]) request may be used such as described above. For instance, processing of the Decrypt(KeyID, Ciphertext, [AAD]) may require, by programming logic and/or policy enforced by the cryptography service, both that the AAD contain particular values and that the AAD be authentic (e.g., not modified since original transmission).

The Shred(KeyID), in an embodiment, may be used to cause the cryptography service to electronically shred a key or family of keys identified by the specified KeyID. Electronic shredding may include making the key no longer accessible. For example, use of the Shred(KeyID) request may cause the cryptography system to command one or more hardware devices to perform a SecureErase operation on one or more keys identified by the specified KeyID. Generally, the key(s) identified by the KeyID may be electronically shredded in any suitable manner, such as by overwriting data encoding the key with other data (e.g., a series of zeros or ones or a random string). If the key(s) are stored encrypted under a key, the key used to encrypt the keys may be electronically shredded, thereby causing a loss of access to the key(s). In some embodiments, the shred operation may cause decrypt operations indicating the shredded KeyID to fail at some determined point in the future. Other manners of securely and permanently destroying any possible access to the key(s) may be used.

The ReKey(Ciphertext, OldKeyID, NewKeyID) request, in an embodiment, may be used to cause the cryptography service to encrypt ciphertext under a different key. When the cryptography service receives a ReKey(Ciphertext, OldKeyID, NewKeyID) request, it may use a key identified by the OldKeyID to decrypt the specified ciphertext and then use a key identified by the NewKeyID to encrypt the decrypted ciphertext. If a key identified by the NewKeyID does not yet exist, the cryptography service may generate a key to use and associate the generated key with the specified NewKeyID, such as described in connection the Create (KeyID) request described above. In some embodiments, the ReKey operation may be operable to cause data to be transferable between isolated instances of a cryptography service. In some embodiments, a policy might permit a rekey operation to be performed on a ciphertext but might not permit the same requestor to directly decrypt the ciphertext. In some embodiments, ReKey might support rekeying a ciphertext from a key identified by a first KeyID within a first account to a key identified by a KeyID within a second account.

Similarly, the frontend system may implement a policy configuration API which, in an embodiment, enables users to submit requests for configuring policies for the performance of cryptographic operations and for other policy-related operations. Policies may be associated with keys, groups of keys, accounts, users and other logical entities in various embodiments. Example policies, which may be configured via the policy configuration API, are provided below. In an embodiment, the cryptography service policy configuration API includes the following requests:

SetKeyPolicy(KeyID, Policy)
Suspend(KeyID, Public Key)
Reinstate(KeyID, Private Key)

In an embodiment, the SetKeyPolicy(KeyID, Policy) request may be used to cause the cryptography service to store a policy on the key (or family of keys) identified by the KeyID. A policy may be information that is determinative of whether a requested cryptographic operation can be performed in a particular context. The policy may be encoded in a declarative access control policy language, such as eXtensinble Access Control Markup Language (XACML), Enterprise Privacy Authorization Language (EPAL), Amazon Web Services Access Policy Language, Microsoft SecPol or any suitable way of encoding one or more conditions (e.g., by encoding an access control list (ACL) or portion thereof) that must be satisfied for a cryptographic operation to be performed. Policies may define what operations can be performed, when the operations can be performed, which entities can make authorized requests for operations to be performed, which information is required for a particular request to be authorized, and the like. In addition, policies may be defined and/or enforced using access control lists, privileges associated with users, and/or operation bitmasks in addition to or instead of the examples given above. Example policies appear below.

In some embodiments the cryptographic service may support a suspend operation, e.g., using a Suspend(KeyID, Public Key) API call. A suspend operation enables the customer of the cryptographic service to deny the operator of the cryptographic service use of or access to a key. This can be useful to customers concerned about covert lawful orders or other circumstances in which the operator of the cryptographic service might be compelled to perform some operation using a key. It may also be useful to customers that wish to lock particular data and render it inaccessible online. In some embodiments, a suspend operation might include receiving a public key from a customer and encrypting the key specified by a given KeyID with the received public key and shredding the key specified by the KeyID, such that the provider is not able to access the suspended key unless the private key associated with the public key is provided, e.g., using a Reinstate(KeyID, Private Key) API call that both specifies the KeyID and includes the private key. In some other embodiments, a suspend operation might involve encrypting a key associated with a specified KeyID using another key managed by the cryptographic service, including without limitation one created for the purpose of the instant suspend operation. The ciphertext produced by this operation can be provided to the customer and not retained within the cryptographic service. The original key identified by the KeyID can then be shredded. The cryptographic service may be operable to receive the provided ciphertext and re-import the suspended key. In some embodiments the ciphertext may be generated in a manner that will prevent the cryptographic service from returning a decrypted version to the customer.

Figure 3:
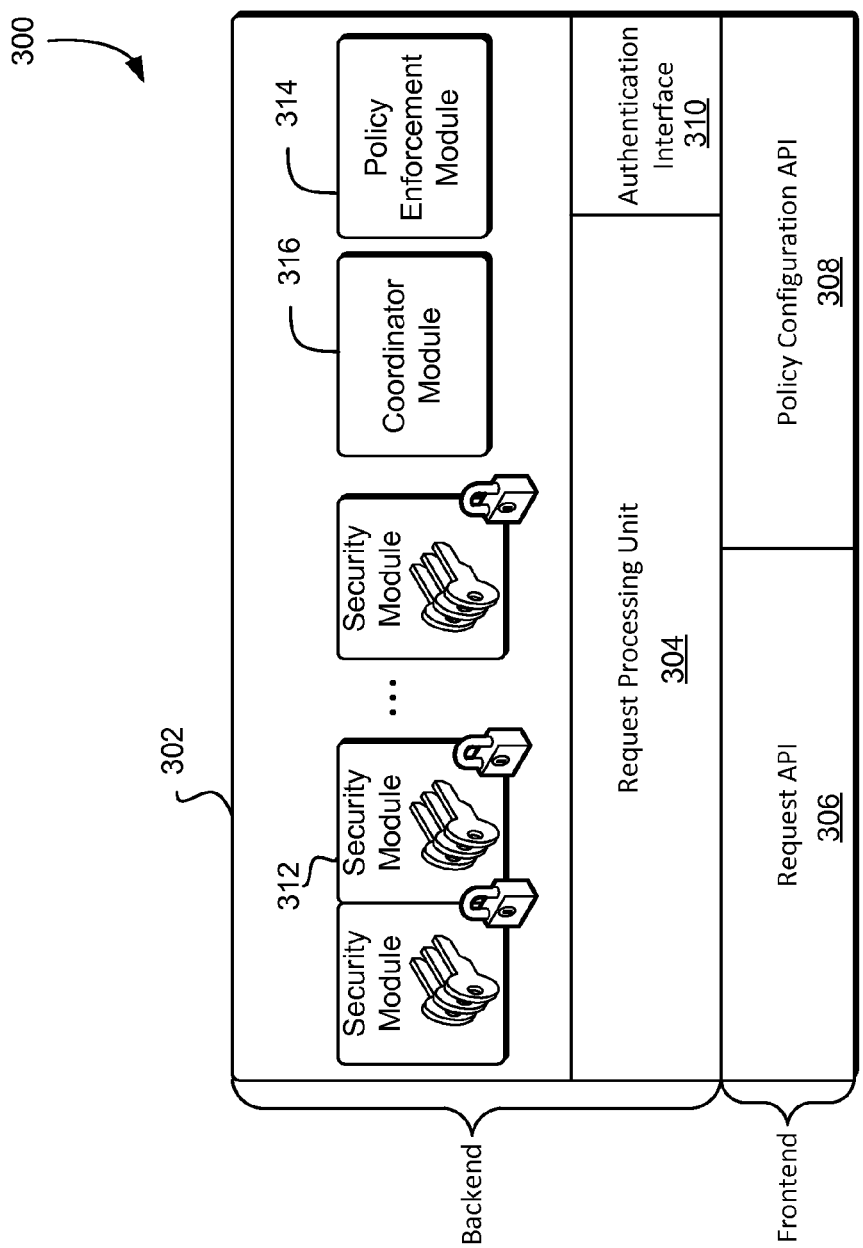
FIG. 3 shows an illustrative example of a cryptography service in accordance with at least one embodiment.

As illustrated in FIG. 3, the cryptography service 300 includes a backend system 302 that itself comprises various components in some embodiments. For example, the backend system in this example includes a request processing system (unit) 304 which may be a subsystem of the cryptography service 300 that is configured to perform operations in accordance with requests received through either the request API 306 or the policy configuration API 308. For example, the request processing component may receive requests received via the request API and the policy configuration API determines whether such requests are authentic and are therefore fulfillable and may fulfill the requests. Fulfilling the request may include, for example, performing and/or having performed cryptographic operations. The request processing unit may be configured to interact with an authentication interface 310 which enables the request processing unit to determine whether requests are authentic. The authentication interface may be configured to interact with an authentication service such as described above. For example, when a request is received by the request processing unit, the request processing unit may utilize the authentication interface to interact with an authentication service which may, if applicable, provide authentication proof that may be used in order to cause a performance of cryptographic operations.

The backend system of the cryptography service 300 also, in this illustrative example, includes a plurality of a security modules 312 (cryptography modules), a policy enforcement module 314, and a coordinator module 316. Returning to FIG. 3, one or more of the security modules may be hardware security modules although, in various embodiments, a security module may be any suitable computer device configured according to have capabilities described herein. Each security module in an embodiment stores a plurality of keys associated with KeyIDs. Each security module may be configured to securely store the keys so as to not be accessible by other components of the cryptography service 300 and/or other components of other systems. In an embodiment, some or all of the security modules are compliant with at least one security standard. For example, in some embodiments, the security modules are each validated as compliant with a Federal Information Processing Standard (FIPS) outlined in FIPS Publication 140-1 and/or 140-2, such as one or more security levels outlined in FIPS Publication 140-2. In addition, in some embodiments, each security module is certified under the Cryptographic Module Validation Program (CMVP). A security module may be implemented as a hardware security module (HSM) or another security module having some or all capabilities of an HSM. In some embodiments, a validated module is used to bootstrap operations. In some embodiments, customers can configure some keys that are stored in and operated on only by validated modules and other keys that are operated on by software. In some embodiments, the performance or cost associated with these various options may differ.

The security modules may be configured to perform cryptographic operations in accordance with instructions provided by the request processing unit. For example, the request processing unit may provide ciphertext and a KeyID to an appropriate security module with instructions to the security module to use a key associated with the KeyID to decrypt the ciphertext and provide in response the plaintext. In an embodiment, the backend system of the cryptography service 300 securely stores a plurality of keys forming a key space. Each of the security modules may store all keys in the key space; however, variations are considered as being within the scope of the present disclosure. For example, each of the security modules may store a subspace of the key space. Subspaces of the key space stored by security modules may overlap so that the keys are redundantly stored throughout the security modules. In some embodiments, certain keys may be stored only in specified geographic regions. In some embodiments, certain keys may be accessible only to operators having a particular certification or clearance level. In some embodiments certain keys may be stored in and used only with a module operated by a particular third party provider under contract with the provider of data storage services. In some embodiments, constructive control of security modules may require that lawful orders seeking to compel use of keys other than as authorized by the customer to involve either additional entities being compelled or additional jurisdictions compelling action. In some embodiments, customers may be offered independent options for the jurisdiction in which their ciphertexts are stored and their keys are stored. In some embodiments, security modules storing keys may be configured to provide audit information to the owner of the keys, and the security modules may be configured such that the generation and providing of audit information not suppressible by the customer. In some embodiments, the security modules may be configured to independently validate a signature generated by the customer such that the provider (e.g., hosting the security modules) is not able to perform operations under keys stored by the security modules. In addition, some security models may store all of the key space and some security modules may store subspaces of the key space. Other variations are also considered as being the scope of the present disclosure. In instances where different security modules store different subspaces of the key space, the request processing unit may be configured such as with a relational table or other mechanism to determine which security module to instruct to perform cryptographic operations in accordance with various requests.

In an embodiment, the policy enforcement module is configured to obtain information from a request processing unit and determine, based at least in part on that information, whether the request received through the API may be performed. For example, when a request to perform cryptographic operation is received through the request API, the request processing unit may interact with the policy enforcement module to determine whether fulfillment of the request is authorized according to any applicable policy such as policy applicable to a specified KeyID in the request and/or other policies such as policy associated with the requestor. If the policy enforcement module allows fulfillment of the request, the request processing unit may, accordingly, instruct an appropriate security module to perform cryptographic operations in accordance with fulfilling the request.

As with all figures described herein, numerous variations are considered as being within the scope of the present disclosure. For example, FIG. 3 shows the policy enforcement module separate from security modules. However, each security module may include a policy enforcement module in addition to or instead of the policy enforcement module illustrated as separate. Thus, each security module may be independently configured to enforce policy. In addition, as another example, each security module may include a policy enforcement module which enforces policies different from policies enforced by a separate policy enforcement module. Numerous other variations are considered as being within the scope of the present disclosure.

Figure 4:
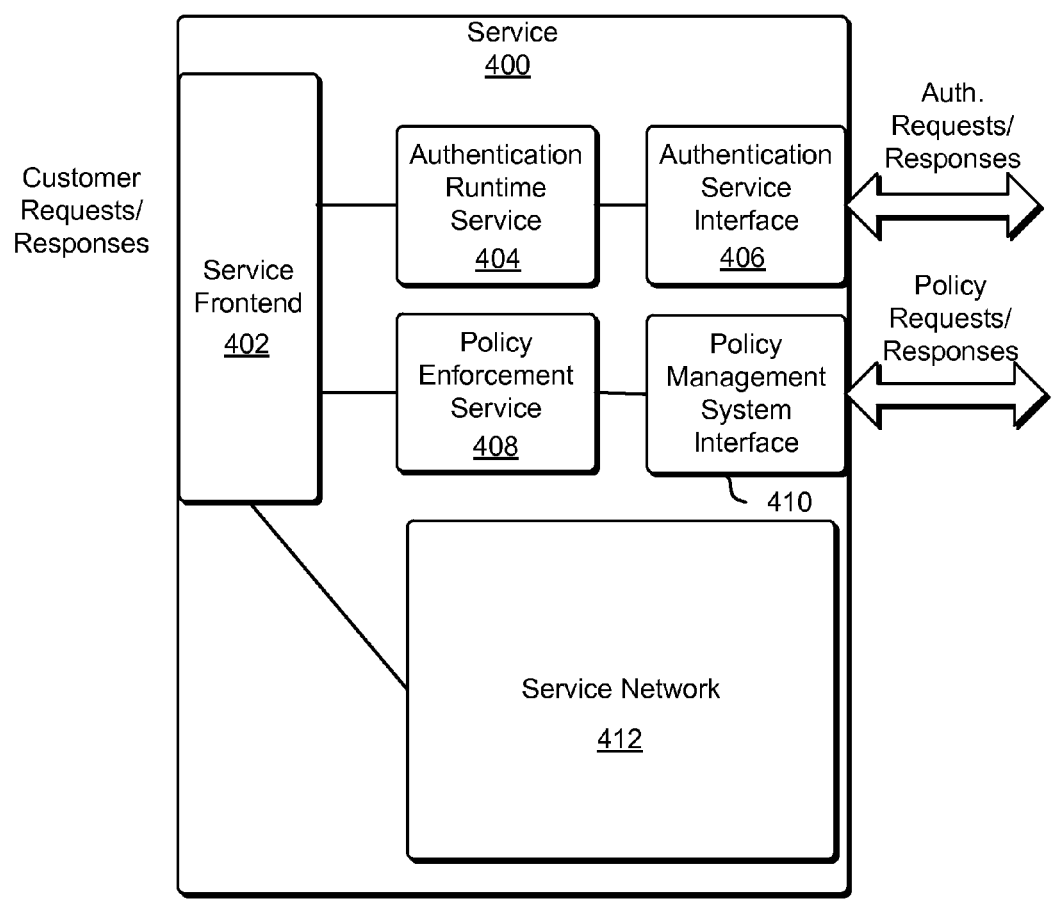
FIG. 4 shows an illustrative example of a service in accordance with at least one embodiment.

As illustrated in FIG. 4 the service frontend 402 also communicates with a policy enforcement service 408 in order to determine whether to fulfill certain requests. The policy enforcement service 408 may be a subsystem of the service 400 that comprises the collection of computing resource collectively configured to enable the service frontend 402 to determine whether to fulfill or deny requests. As with the authentication runtime service 404, the policy enforcement service 408 may communicate with a policy management system (not illustrated in the figure) for the purpose of determining whether fulfillment of a request is in compliance with the policy. For example, when the service frontend 402 receives a request, it may transmit the request or information based at least in part on the request to the policy enforcement service 408. The policy enforcement service 408 may transmit information, via a policy management system interface 410, to a policy management system in order to make the determination. As with the authentication runtime service 404, the policy enforcement service 408 may cache various information in order to enable determinations of whether fulfillment of requests comply with policies without communicating with the policy management system.

In various embodiments, the service frontend 402 also communicates with a service network 412 when received requests are determined to be both authentic and fulfillable in compliance with policy. The service network 412 may be a subsystem of the service 400 comprising a collection of computing resources configured to operate in support of providing a service. For example, in an embodiment whether the service 400 is a virtual computer system service, the service network 412 may comprise a plurality of physical host computing devices that implement virtual computer systems on behalf of customers of the service 400. Requests through the service frontend 402 may relate to operation of the virtual computer systems implemented using the service network 412. For instance, requests may be submitted to the service frontend 402 for the purpose of provisioning, deprovisioning, modifying, or otherwise remotely managing virtual computer systems. In the example of a block data storage service, the service network 412 may comprise a collection of data storage servers with corresponding data storage devices. The service frontend 402 may interact with the service network 412 for various purposes such as allocating storage space to customers, deallocating storage space for customers, and generally in connection with management of one or more virtual block level data storage devices provided by the service 400. In the example of a cryptography service, the service network 412 may include various hardware devices that enable the secure management of cryptographic keys. For example, the service network 412 may comprise a plurality of security modules (e.g., hardware security modules) which may be devices that securely store cryptographic key material. The service network for a cryptography service may also include data storage devices for storing keys on behalf of customers and generally other devices supporting operation of the cryptography service. In the example of an on-demand data storage service, the service network 412, as with the block data storage service, may include data storage servers and corresponding data storage devices. The service network may also include one or more databases in order to operate as key value stores to enable the efficient location of data within the service network 412. The service network 412 may also include other devices (e.g., server computer systems), such as devices that operate to durably, i.e., redundantly store data to perform garbage collection processes and the like. Generally, the service network 412 may include computing resources applicable to the service being provided. Also, while not illustrated, the service network 412 may include appropriate networking devices such as routers, switches, load balancers, and other devices that enable the collective operation of the devices in the service network 412. Of course, the exact resources that are included and their collective configuration will vary in accordance with the various services and the various embodiments in which they are implemented.

Figure 5:
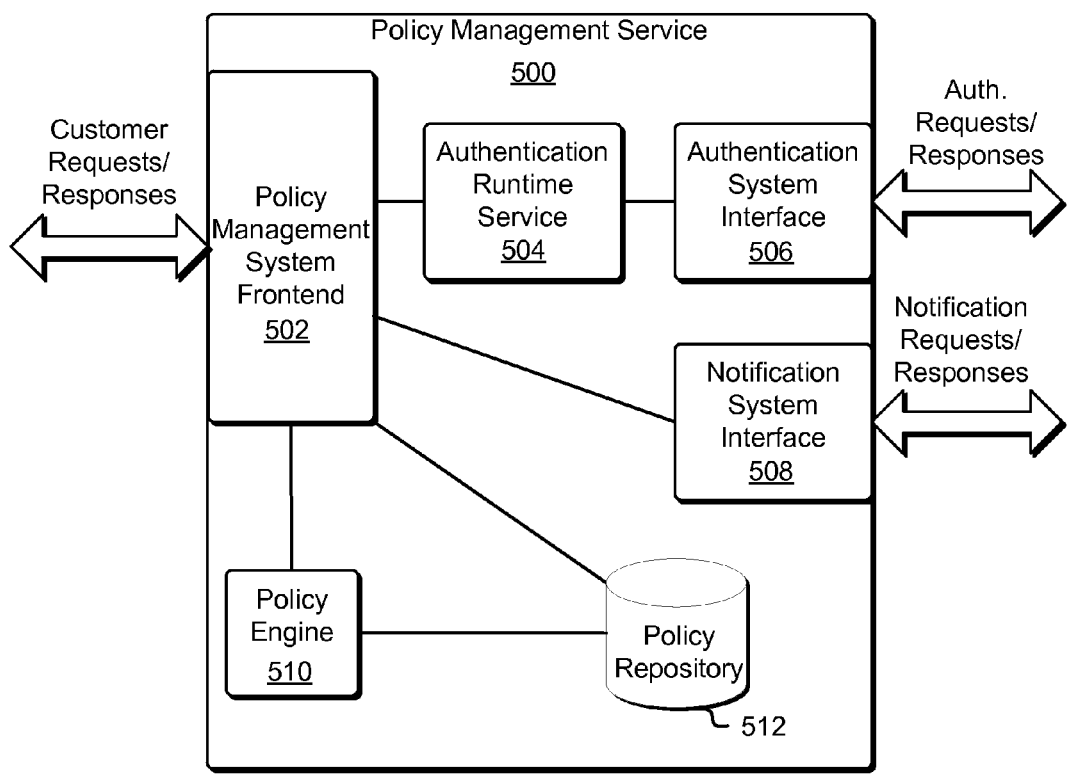
FIG. 5 shows an illustrative example of a policy management service in accordance with at least one embodiment.

FIG. 5 shows an illustrative example of a policy management service 500 in accordance with various embodiments. As illustrated in FIG. 5 the policy management service 500 includes a policy management system frontend 502. The policy management system frontend 502 may be configured such as the service frontend 402 described above in connection with FIG. 4. In particular, the policy management system frontend 502 may be configured to receive customers' requests and provide responses to those requests. The policy management system frontend 502 may also be configured to receive requests from other services, such as for determinations whether requests are fulfillable according to policy. Requests to the policy management system frontend 502 may be various requests in connection with the management of policy or an account of a computing resource provider. For example, a request to the policy management system frontend may be an appropriately configured API call to add a policy, to delete a policy, to change a policy, and generally to perform various actions in connection with policies, such as providing an inventory of policies and the like. Addition and/or change of policy may be accomplished through the receipt of definitions of policies, which may comprise structured sets of information specifying parameters that define corresponding policies. Generally, the policy management system frontend 502 may receive indications of policies, where the indications are definitions of policies themselves (i.e., are encodings of policies in requests), where the indications refer to predefined policies or policies, which may be updated over time (e.g., in accordance with changes made to one or more compliance regimes, such as described below). An illustrative example of how a policy may be organized is discussed below in connection with FIGS. 6-7. Further, while various techniques described herein are illustrated with respect to customers providing their own policies, the policy management system frontend 502 (or another subsystem) may be used by the computing resource service provider to receive indications of policies on behalf of customers. For example, the computing resource service provider may enter into an agreement with a customer whereby the computing resource service provider agrees to manage data in compliance with one or more compliance regimes, such as described below. To comply with the agreement, the computing resource service provider may utilize the policy management system to make effective one or more data transformation (and/or other) policies that enable the computing resource service provider to manage data of the customer in compliance with the compliance regime.

As with other frontend systems described herein, the policy management system frontend 502 may include one or more webservers that perform different operations. For example, in an embodiment, the policy management system frontend 502 may include a webserver that provides, over a network such as the Internet, a console interface for managing policies. The console interface may be a graphical user interface (GUI) with various GUI controls that allow users to perform various actions in connection with the management of policy. Example actions include the definition of policies and submission of defined policies. A user may, for instance, use various GUI controls (drop down menus, check boxes, text entry boxes and the like) for defining a policy and then interact with the GUI to cause the webserver to submit the defined policy. Submission of the defined policy in a request (or, generally, submission of any request transmitted via the GUI), may cause the request to be transmitted from the webserver providing the GUI to another webserver that orchestrates the processing of the requests, such as described below. The other webserver may also be available to customers for submission of requests directly instead of through the webserver providing the GUI. Other variations are also considered as being within the scope of the present disclosure.

As with the service 400 described above in connection with FIG. 4, the policy management service 500 may include an authentication runtime service 504 and an authentication system interface 506 in order to enable the policy management system frontend 502 to fulfill or deny requests as appropriate. As with the service frontend 402, the policy management system frontend 502 may interact (e.g., via appropriately configured communication signals) with various components in order to provide policy management services. For example, as illustrated in FIG. 5, the policy management system frontend 502 may utilize a notification system interface 508 to communicate with a notification system such as described above. The notification system may be used in order to alert users associated with an account of certain types of activity in connection with one or more policies of the account. For example, as noted in more detail below, attempted additions to a set of policies for the account may cause the policy management system frontend 502 to cause the notification system to provide one or more notifications of the attempted policy addition. In this manner, receipt of the notification enables appropriate action to be taken such as when addition of a policy is improper.

The policy management system frontend 502, in an embodiment, utilizes a policy engine 510 which may be a subsystem of the policy management service 500 comprising a collection of computing resources collectively configured to evaluate policy. The policy engine 510 may receive from the policy management system frontend 502 a request that has been received and/or information based at least in part thereon. The policy engine 510 may identify any policies applicable to the request, evaluate whether fulfillment of the request is in compliance with any applicable policies, and provide notification to the policy management system frontend 502 whether fulfillment of the request is in compliance with existing policy. The policy engine 510 may operate in various ways in accordance with various embodiments. For instance, as discussed below, policies may be encoded in policy documents which encode various information regarding principals, such as users, and conditions for the principals' access to computing resources such as cryptographic keys, data objects, logical containers for data objects and other items to which policies apply. The policy engine (or another system working in concert with the policy engine) may use the information in the policies to determine which of a set of policies apply to a particular request. For example, if a request is submitted by a particular identity identified in the request, the policy engine may select policies applicable to that entity. If the request involves a particular resource, the policy engine may select policies that are applicable to the particular resource. In addition, as discussed in more detail below, policy documents may include information that is indicative of whether the policy document is currently effective (i.e., whether one or more policies encoded in the policy document are currently enforced), such as information indicating time when effectiveness of one or more policies encoded in the policy documents begins. Identifying applicable policy documents may include selecting policy documents that are in force and disregarding policy documents that are not in force.

The policy engine may sequentially or otherwise process the policies to determine whether each of the selected policies allow fulfillment of the request. The policy engine may transmit a notification (e.g., in the form of a response to a request to evaluate policy submitted by the policy management frontend system 502) to the policy management frontend system 502 that indicates whether the set of policies for an account corresponding to the policies allows or precludes fulfillment of the request. Additional information, such one or more reasons fulfillment of the request is precluded by policy (e.g., information identifying one or more policies that would be violated by fulfillment of the request and/or information based at least in part on the policies that would be violated by fulfillment of the request).

To enable large scale policy management for multiple users, the policy management service 500 may include a policy repository 512 which may comprise one or more data storage devices that store policy documents that encode policies of the various accounts of computing resource service provider. In some embodiments, the policy repository 512 stores policies for multiple entities (e.g., customers of a computing resource service provider) and, accordingly, stores policies in direct or indirect association with the entities to which the policies correspond.

As illustrated in FIG. 5, the policy management system frontend 502 upon receipt of a request may utilize the authentication runtime service 504 to determine whether the request is authentic. If the request is authentic, the policy management system frontend 502 may submit a policy evaluation request to the policy engine 510 to determine whether the request is in compliance with applicable existing policy. The policy engine 510, if it does not have such information cached, may interact with the policy repository 512 in order to obtain applicable policies. The policy engine 510 may, for example, access all policies for an account associated with the request from the policy repository 512 and identify from the access policies any policies which are applicable to the request. As noted, the policy engine may cache policies in order to avoid communication with the policy repository 512 which may be implemented across a network from the policy engine 510.

For certain types of requests, the policy management system frontend 502 may interact with the policy repository 512. For example, if such actions are allowed by existing policy the policy management system frontend 502 may transmit new policies to the policy repository 512, may transmit commands to the policy repository 512 to delete one or more policies, and/or generally to change a set of policies or an account associated with the request (e.g., by modifying an existing policy).

As noted above, various policies utilized by customers of a computing resource service provider may be encoded in the form of policy documents. The policy document in an embodiment is a document, i.e., organized collection of information, that operates as a container for one or more statements. The policy document may be a Javascript Object Notation (JSON), an eXtensible Markup Language (XML) document, another document using a structured markup language, or other way of organization information. It should be noted that a policy document may encode one or more policies that are defined by corresponding statements. It should also be noted that a policy may include one or more sub-policies. In other words, a policy may comprise a collection of policies. For example, an account of a computing resource service provider may have a policy for a data storage service ("data storage service policy") that comprises a plurality of individual policies, each defining a specific permission. Additionally, it should be noted that the term "policy" may have different meanings in different contexts. As an example, the term "policy" can have a different meaning when used as an uncountable (mass) noun than when used as a countable (count) noun. For instance, a phrase such as "whether policy allows fulfillment of a request" may be interpreted to mean whether a collection of individual policies allows fulfillment of the request. A statement may include conditions which may be any restrictions or details about the statement. The conditions, for example, may specify circumstances for a policy to be in effect.

While policy documents are used for the purpose of illustration, other ways of encoding policies (e.g., by using relational tables of a relational database to store the various information that would be encoded by a policy document and, generally, any mechanism wherein policy declarations may be maintained) may be used in accordance with various embodiments.

In various embodiments, policies are able to define conditions for changing a set of policies, such as a set of policies for an account of a computing resource service provider. A policy on policy addition (which may be referred to as a "policy addition policy") may require that, to be fulfillable, a request to add a proposed policy to a set of policies must be configured such that the proposed policy will not become effective (i.e., be enforced by a system that enforces the set of policies) until a future time, such as a specified number of hours into the future measuring from some reference point in time. The policy on policy addition may define the set of principals to which the policy applies, the resources to which the policy applies, one or more other conditions that must be fulfilled, and one or more actions in addition to denial if the conditions are not fulfilled (or, alternatively, allowance if the conditions are fulfilled). An additional action defined by the policy may, for instance, include one or more actions that result in notification of one or more principals of a request to add a policy. A policy administrator may, for instance, allow one or more others to add policies to a set of policies, but may configure a policy on policy addition such that the policy administrator can add policies without a required delay, but the allowed one or more others can only successfully add policies if the policies are added so as to become effective in compliance with a required delay.

Figure 6:
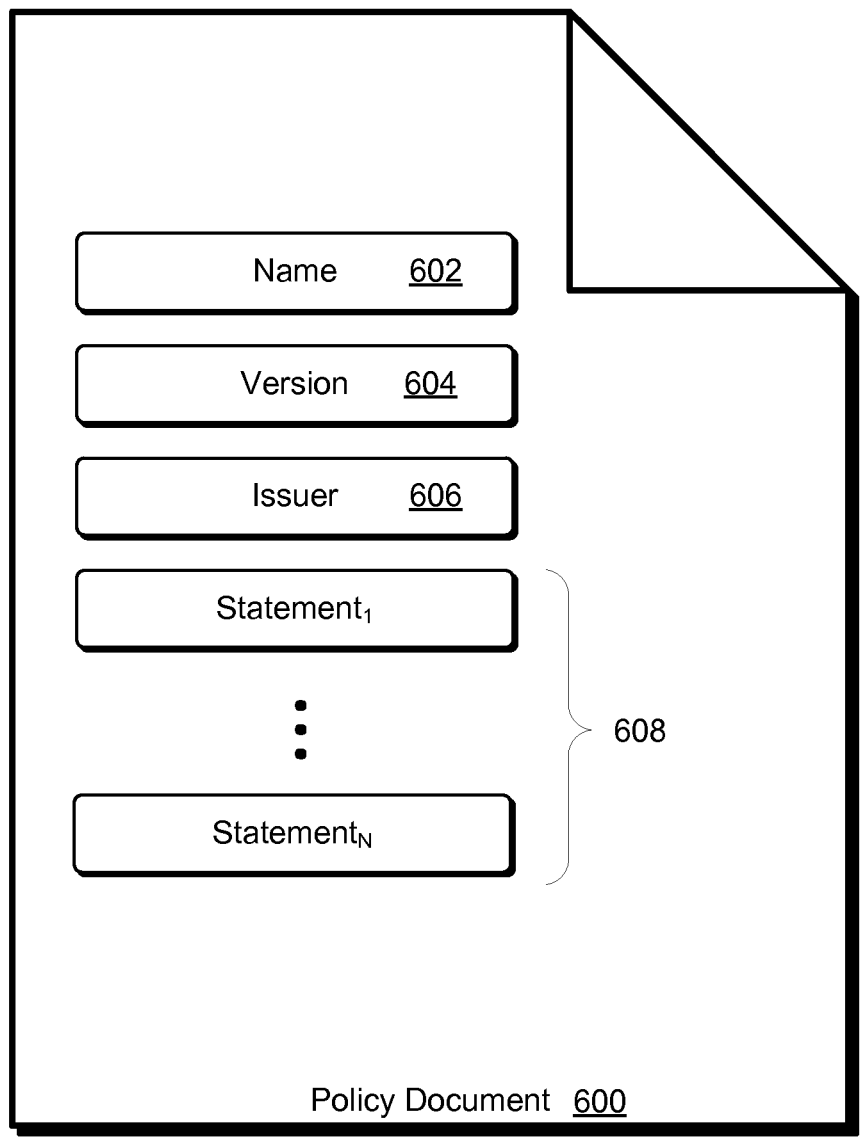
FIG. 6 shows an illustrative example of a policy document in accordance with at least one embodiment.

FIG. 6 shows an illustrative example of a policy document in accordance with an embodiment. In an embodiment, the policy document 600 encodes various information relevant to a policy encoded by the policy document. The policy may be encoded in a declarative access control policy language, such as eXtensinble Access Control Markup Language (XACML), Enterprise Privacy Authorization Language (EPAL), Amazon Web Services Access Policy Language, Microsoft SecPol or any suitable way of encoding one or more conditions that must be satisfied for a request to be fulfillable. As illustrated in FIG. 6, the policy document 600 includes a name 602 which may comprise a string for the policy document 600. The name 602 may, for instance, be used to provide a convenient identifier in using human readable terms. As an example, a name 602 may be a string, for instance, to the effect of "MyDataStoragePolicy." Also as illustrated in FIG. 6, the policy document 600 may include a version 604. The version 604 may be used to track how the policy document 600 changes over time as various requests are received and fulfilled to update policy. Each update to the policy document 600 may cause the version 604 to be updated to a new value. The policy document 600 may also include an issuer 606 which may be an identifier for a user that submitted a request that resulted in creation of the policy document 600 having the current version.

As illustrated in FIG. 6 and noted above, the policy document 600 may include one or more statements 608. Statements in a policy document may be processed using a logical OR. As discussed in more detail below, one or the statements 608 may encode information that indicates a future time when the policy encoded by the policy document 600 is to be effective. For example, the statement may encode a time stamp for a future time at which the policy encoded by the policy document 600 is to be effective. A statement may encode a duration indicating an amount of time that must pass before which the policy document 600 is to be effective where the duration may be measured from some point in time, which may be a global time (e.g., Unix time) or which may be measured from a particular event, such as submission of a request to add a policy that contains the statement or approval of the policy by a policy management system. Generally, the statement may encode any information that immediately or eventually renders determinable a future time at which the policy encoded by the policy document 600 becomes effective. It should be noted that statements may also contain additional information that is not illustrated in the figure, such as a statement identifier that uniquely identifies the statement (globally or within the policy document), and other information which may be used by a policy management system.

Figure 7:
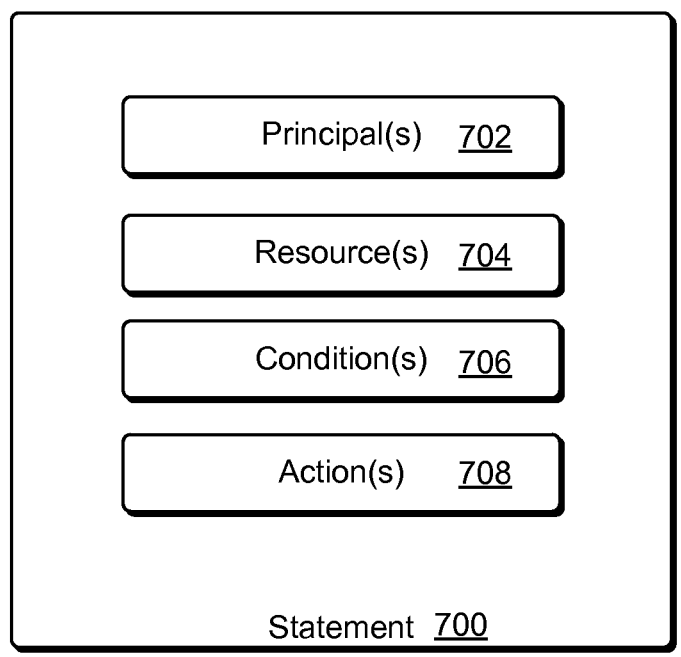
FIG. 7 shows an illustrative example of a policy statement in accordance with at least one embodiment.

As noted above, a statement may be a formal description for a permission or, generally, a formal description of one or more conditions on access to one or more resources. FIG. 7 accordingly, shows an illustrative example of a statement 700 which may be encoded in a policy document, such as described above. As illustrated in FIG. 7, the statement 700 may include information identifying one or more principals 702. A principal may be an entity (e.g., user, computer system, or any entity that may be granted a permission for access to a system or resource within a system) to which the statement 700 applies. As an example, a customer of a computing resource service provider may have an account. The account may be associated with multiple subaccounts each corresponding to a user of the customer. Each user may have a corresponding identifier which may be includable as a principal in a statement. Principals may also be identified in other ways. For example, sets of principals may be identified by an identifier for the set. As an illustrative example, a department in an organization may have a corresponding identifier. A statement may be applicable to the users associated with the department by listing in the statement an identifier for the department. Identifiers for sets of principals may be useful, for instance, when the sets are dynamically changing such as when employees are hired by and/or leave an organization and/or department therein. Generally, sets of principals may be defined based at least in part on characteristics of principals. Identifiers of principals may also be open ended. For example, information may be included that indicate that the statement 700 is applicable to anyone, that is to all users capable of submitting a request on behalf of an account of a computing resource service provider or, generally, all users.

As illustrated in FIG. 7, a statement 700 also identifies one or more resources 704. Resources may be computing resources such as described above. Resources may, for instance, be the subject of the services provided by a computing resource service provider. As an example, a resource may be a virtual computer system, may be a logical data container used to associate data objects together, may be a volume identifier of a block level data storage device, a database, an item stored in a database, a data object (e.g., file) and generally any type of resource which may be provided as a service. In some embodiments, the resources are cryptographic keys, such as cryptographic keys managed by a cryptography service on behalf of customers and/or cryptographic keys used as default keys for one or more data storage services. As with principals, resources may be described using identifiers of sets of resources, which may be defined based at least in part on characteristics of resources. For instance, in some embodiments, virtual computer systems are able to be associated with user generated tags that may be descriptive of a role fulfilled by the virtual computer systems. As an example, a group of virtual computer systems may be associated with a tag "web server." Resources, accordingly, may be identified by such tags. As another example, a resource may correspond to a logical data container thereby causing the statement 700 to be applicable any data objects stored within the logical data container, i.e., associated with the logical data container. Resources (e.g., data objects) may also be defined by keys used to encrypt the resources. In addition to the foregoing, objects to which policy applies (e.g., principals and resources) may be based at least in part on attributes which may be communicated using Security Assertion Markup Language (SAML) and/or attributes that are determined using a directory.

As illustrated in FIG. 7, a statement 700 may also include one or more conditions. The conditions, in an embodiment, are determinative of whether the statement in the policy document applies in a particular context, i.e. applies to a submitted request in the context in which it was submitted. The conditions may utilize Boolean operators (equal, less than, etc.) to allow evaluation of the conditions over other values in the statement (principal, resource, etc.) and other values in an authorization context, which may or may not be provided in a request for which policy is being evaluated. Condition values can include date, time, the Internet Protocol (IP) address of the requester, an identifier of the request source, a user name, a user identifier, and/or a user agent of the requester and/or other values. Values may also be unique to a service to which the condition applies. Conditions may be logically connected for evaluation using logical connectors such as AND and OR.

Statements may also encode one or more actions 708. An encoded action may represent operations that occur when the condition(s) 706 are fulfilled and/or unfulfilled. Example actions include allowing a request to be fulfilled (e.g., allowing requested access) or denying a request. Other actions include transmission of notification in accordance with information encoded in the statement 700, such as transmission of an electronic mail message to one or more electronic mail addresses specified in the statement 700, publishing a notification to a topic of a notification service and/or other actions. Accordingly, an encoded action 708 may include information sufficient for performing the action. In some embodiments, statements may lack actions when, for example, default actions are applicable. For instance a policy management system may operate so that actions are allowed (or denied) policy cause the actions to be denied (or allowed). Defaults may be system wide or may vary (e.g., with customers selecting defaults).

Figure 8:
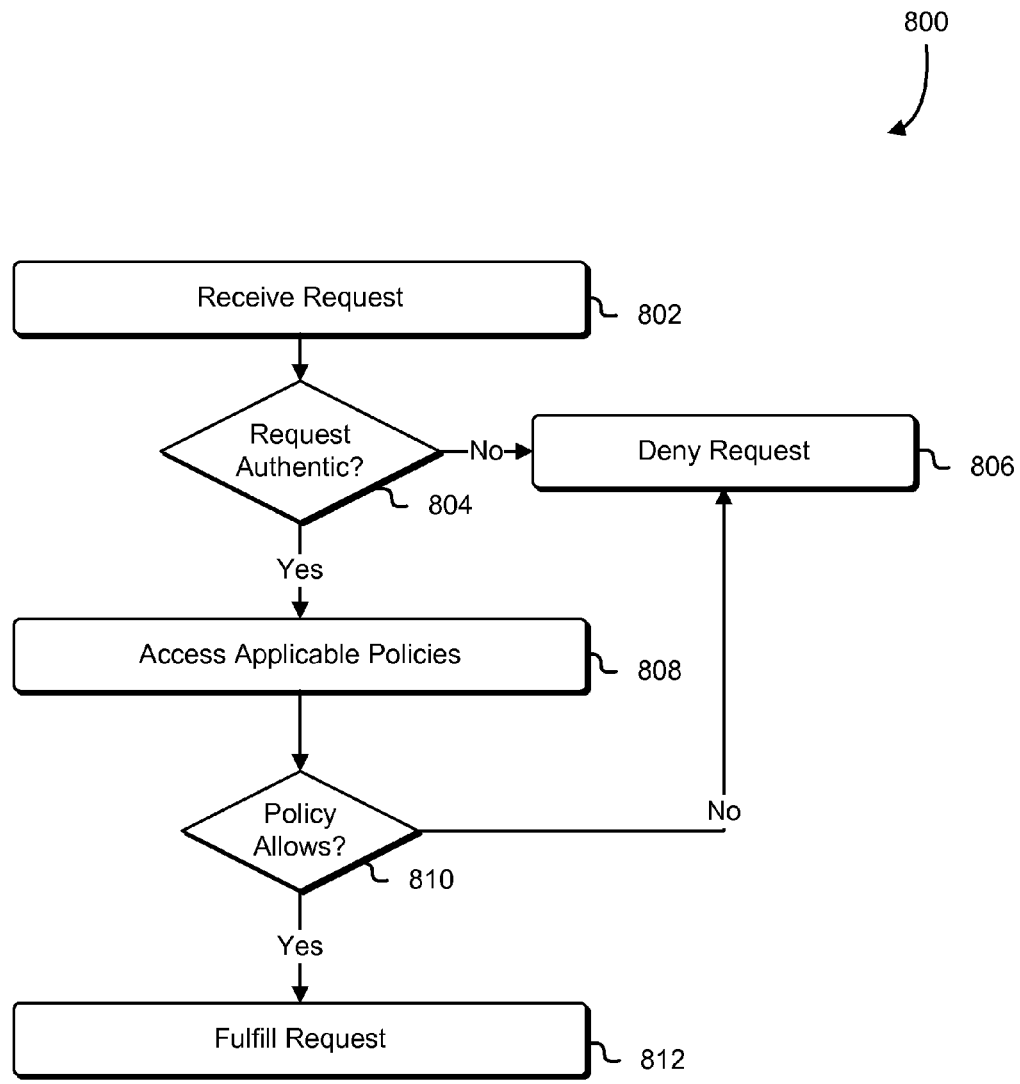
FIG. 8 shows an illustrative example of a process for processing a request in accordance with at least one embodiment.

FIG. 8 shows an illustrative example of a process for processing requests in accordance with an embodiment. The process 800 may be performed by any suitable system or component thereof such as a service described above and/or the service 400 described above. In an embodiment, the process 800 includes receiving 802 a request. The request may be received, for example, as an appropriately configured API call to a frontend system (e.g., comprising a web server) of a system performing the process 800. The API call may be, for instance, in the form of a web service call configured with various parameters applicable to the request. Upon receipt 802 of the request, the process 800 may include determining 804 whether the request is authentic. Determining 804 whether the request is authentic may be performed in any suitable manner. For example, in some embodiments, the request may be signed and, therefore have an associated electronic signature. Accordingly, determining 804 whether the request is authentic may include verifying the electronic signature. Verification of the electronic signature may be done by any suitable system or component thereof. For instance, referring to embodiments described above, an authentication runtime service or authentication service may perform the verification. It should be noted that the verification may be performed by other entities. For instance, in some embodiments, verification is not done in a distributed manner but done by a frontend system such as described above. Generally, any manner in which the authenticity of the request may be determined may be used.

If it is determined 804 that the request is not authentic, the request may be denied 806. Denying the request may be performed in any suitable manner, such as by responding to the request with information indicating the denial by simply taking no action and/or by providing information that indicates one or more reasons why the request is denied and/or additional information which may be necessary to enable addressing the reason for denial. If, however, it is determined 804 that the request is authentic, the process 800 may include accessing 808 one or more applicable policies. Accessing 808 applicable policies may be performed by any suitable system or component thereof, such as by a policy management service described above. Applicable policies may be accessed, for example, by retrieving policy documents from a policy repository such as described above. In some embodiments, timing information indicating when policies become effective is used to select a subset of policies from a set of policies that are applicable (e.g., a set of policies that, without regards to the timing information, would apply to the request). The selected subset may comprise those policies that have timing information indicative of the policies in the subset currently being in effect.

A determination may then be made 810 whether applicable policies allow fulfillment of the request. A determination 810 whether policy allows fulfillment of the request may be performed by any suitable system such as by a policy engine described above. A policy engine or other system determining whether policy allows fulfillment of the request may analyze applicable policies to determine whether the policy allows fulfillment of the request. As discussed, the manner in which the analysis takes place may vary in accordance with various embodiments. For example, applicable policies or, generally, potentially applicable policies may be analyzed in sequence. If a policy in a sequence of policy would be violated by fulfillment of a request, a determination may be made that policy does not allow fulfillment of the request without analyzing the remainder of the sequence (if any). More complex processing may also be performed. For example, if a statement in a policy document indicates that fulfillment of the request would violate policy encoded in the statement, a determination may be made whether any additional policies supersede that policy and allow fulfillment of the request. Generally, the policies may be analyzed in any suitable manner, and the manners may vary in accordance with which the various systems are configured and how policies are encoded. If it is determined 810 that policy does not allow the request to be fulfilled, the process 800 may include denying 806 the request such as described above. If, however, it is determined 810 that policy does allow fulfillment of the request, the request may be fulfilled 812.

As with all processes discussed herein, variations are considered as being within the scope of the present disclosure. For example, the process 800 and other processes described herein may include additional operations in addition to those illustrated and/or discussed herein. For example, in some instances, a system, such as a policy enforcement system may maintain (or have maintained by another system) an audit log of requests. An audit log may be made on a system-wide basis, on a customer-specific basis so that each customer of a service provider has a corresponding audit log or otherwise. The audit log may record requests that were received by a system (e.g., computing resource service) and store information associated with the requests, such as whether the requests were fulfilled, denied, unsuccessfully fulfilled and the like. Other information associated with a request stored in an audit log may include information identifying a submitter of the request (requestor), computing resources affected by the request, information about when the request was received and the like. In some embodiments, when requests are received, information is written to an audit log that identifies one or more services that caused the request to be submitted (e.g, a via set, as discussed in more detail below). For example, if the request was submitted by a first service as a result of having received a request from a second service, information may be written to the audit log that identifies the first and second service. Such information may indicate an order of causation of events that caused the request and/or may include other information.

Figure 9:
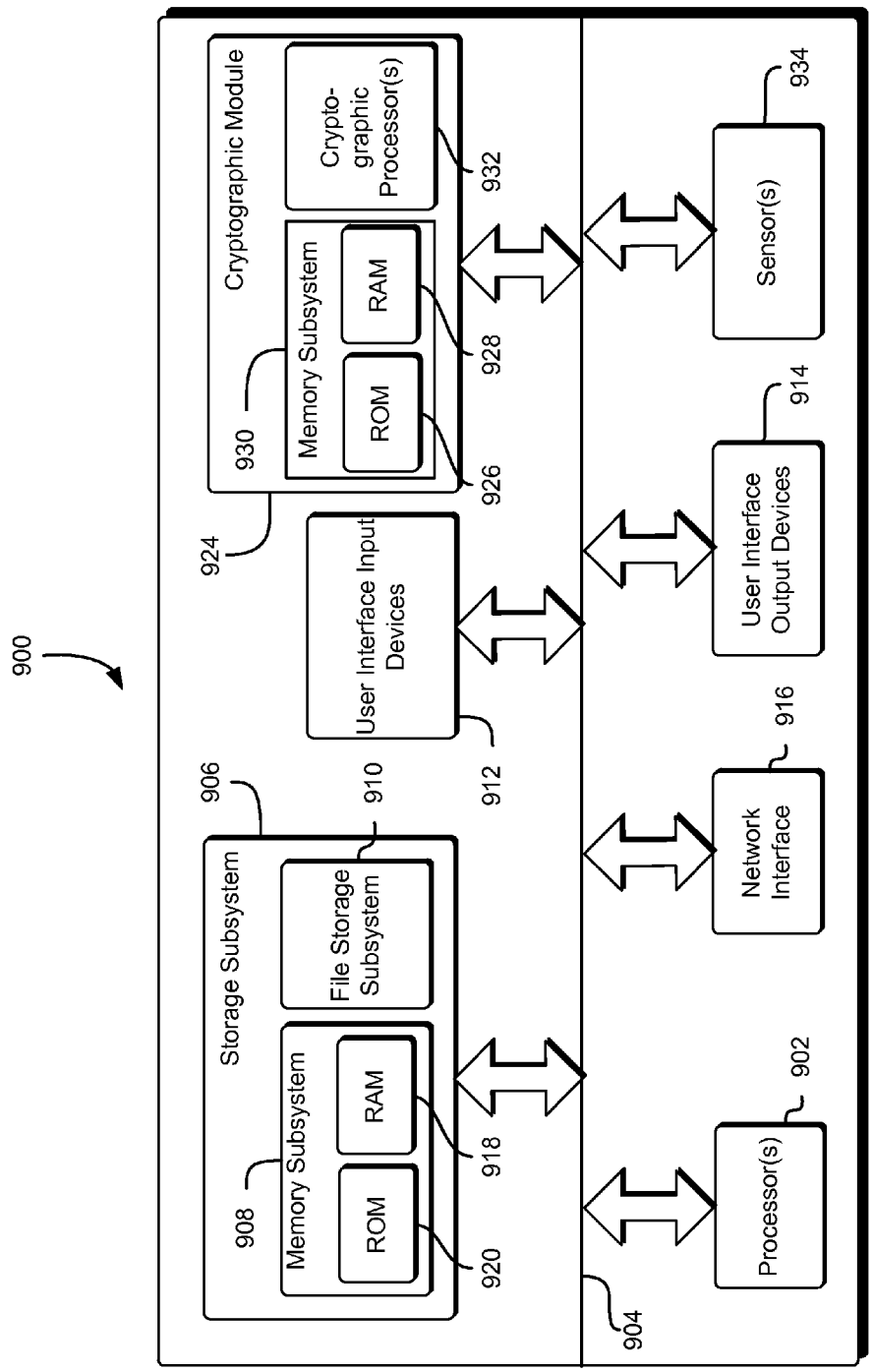
FIG. 9 shows a diagram illustrating components of an example computer system in accordance with at least one embodiment.

FIG. 9 is an illustrative, simplified block diagram of an example device system 900 that may be used to practice at least one embodiment of the present disclosure. In various embodiments, the device system 900 may be used to implement any of the systems illustrated herein and described above. For example, the device system 900 may be used to implement an authentication object manager and other applications, such as a browser application, in accordance with various embodiments. As shown in FIG. 9, the device 900 may include one or more processors 902 that may be configured to communicate with and are operatively coupled to a number of peripheral subsystems via a bus subsystem 904. These peripheral subsystems may include a storage subsystem 906, comprising a memory subsystem 908 and a file storage subsystem 910, one or more user interface input devices 912, one or more user interface output devices 914, a network interface subsystem 916, a cryptographic module 924, comprising a memory subsystem 930 and one or more cryptographic processors 932. The peripheral subsystems may also include one or more sensors 934 in addition to sensors of input devices 912. Such sensors may include, but are not limited to, GPS sensors, accelerometers, temperature sensors and others.

The bus subsystem 904 may provide a mechanism for enabling the various components and subsystems of device system 900 to communicate with each other as intended. Although the bus subsystem 904 is shown schematically as a single bus, alternative embodiments of the bus subsystem may utilize multiple busses.

The network interface subsystem 916 may provide an interface to other device systems and networks. The network interface subsystem 916 may serve as an interface for receiving data from and transmitting data to other systems from the device system 900. For example, the network interface subsystem 916 may enable transmission of authentication objects and other information, such as electronic requests to access a system (e.g., receive a webpage) and may enable receipt of responses to the requests, such as webpages or other information. The network interface subsystem 916 may also facilitate the receipt and/or transmission of data on other networks, such as an organizations intranet and/or other networks described below.

The user interface input devices 912 may include one or more buttons, a keyboard, keypad, pointing devices, such as an integrated mouse, trackball, touchpad, or graphics tablet, a scanner, a barcode scanner, a fingerprint scanner, a retinal scanner, a touchscreen incorporated into a display, audio input devices, such as voice recognition systems, microphones, fingerprint readers, retinal scanners and other types of input devices. Further, in some embodiments, input devices may include devices usable to obtain information from other devices, such as long-term or short-term credentials for use in generating an authentication object, as described above. Input devices may include, for instance, magnetic or other card readers, one or more USB interfaces, near field communications (NFC) devices/interfaces and other devices/interfaces usable to obtain data (e.g., long-term or short-term credentials) from other devices. In general, use of the term "input device" is intended to include all possible types of devices and mechanisms for inputting information to the device system 900.

User interface output devices 914, if any, may include a display subsystem, a printer or non-visual displays, such as audio and/or tactile output devices, etc. Generally, the output devices 914 may invoke one or more of any of the five senses of a user. The display subsystem may be a cathode ray tube (CRT), a flat-panel device, such as a liquid crystal display (LCD), light emitting diode (LED) display, or a projection or other display device. In general, use of the term "output device" is intended to include all possible types of devices and mechanisms for outputting information from the device system 900. The output device(s) 914 may be used, for example, to present user interfaces to facilitate user interaction with applications performing processes described herein and variations therein, when such interaction may be appropriate. While a device 900 with user interface output devices is used for the purpose of illustration, it should be noted that the device 900 may operate without an output device, such as when the device 900 is operated in a server rack and, during typical operation, an output device is not needed.

The storage subsystem 906 may provide a computer-readable storage medium for storing the basic programming and data constructs that may provide the functionality of at least one embodiment of the present disclosure. The applications (programs, code modules (i.e., programming modules), instructions) that, when executed by one or more processors, may provide the functionality of one or more embodiments of the present disclosure, may be stored in the storage subsystem 906. These application modules or instructions may be executed by the one or more processors 902. The storage subsystem 906 may additionally provide a repository for storing data used in accordance with the present disclosure. The storage subsystem 906 may comprise a memory subsystem 908 and a file/disk storage subsystem 910.

The cryptographic module 924, which may be a trusted platform module (TPM), includes a memory subsystem 930, including a main random access memory (RAM) 928 for storage of instructions and data during program execution and a read only memory (ROM) 926, in which fixed cryptographic information may be stored, such as a hardware secret stored securely within the device 900 so as to be non-exportable (i.e., inaccessible through any call to the cryptographic module 924). The cryptographic module 924, in some embodiments, operates wholly or partly in compliance with Trusted Computing Group's TPM Main Specification level 2, Version 1.2, Revision 116, TPM Main Specification level 2, Version 1.2, Revision 103 and/or ISO/IEC 11889, which are incorporated herein by reference. The device 900 may also store cryptographic keys in RAM 928 and/or processor registers for temporary cryptographic processing. The cryptographic information stored in memory may be used in combination with cryptographic information obtained via the network interface 916 and/or one or more of the user interface input devices 912. The one or more cryptographic processors may be used to perform cryptographic operations in the device and may include a random number generator, SHA-2 or other hash generator and an encryption-decryption-signature engine.

The one or more cryptographic processors may also be configured to perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one way functions and include, but are not limited to algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure. Generally, one or more components of the cryptographic module 924 may be configured to collectively perform various operations used generating cryptographically verifiable information for authentication objects.

As noted above, in various embodiments of the present disclosure, hardware secrets are securely stored within the cryptographic module 924. In some embodiments, the cryptographic module is implemented as or may contain a physically unclonable function (PUF), which is a function implemented in physical hardware to use one or more hardware secrets that are based at least in part on physical characteristics of the PUF. As a result, any attempt to obtain a hardware secret may require physical intrusion into the PUF and physical intrusion may alter the physical characteristics of the PUF, thereby destroying the hardware secret. Example PUFs that may be used include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs and/or other devices whose physical characteristics encode information usable as or for a hardware secret.

Figure 10:
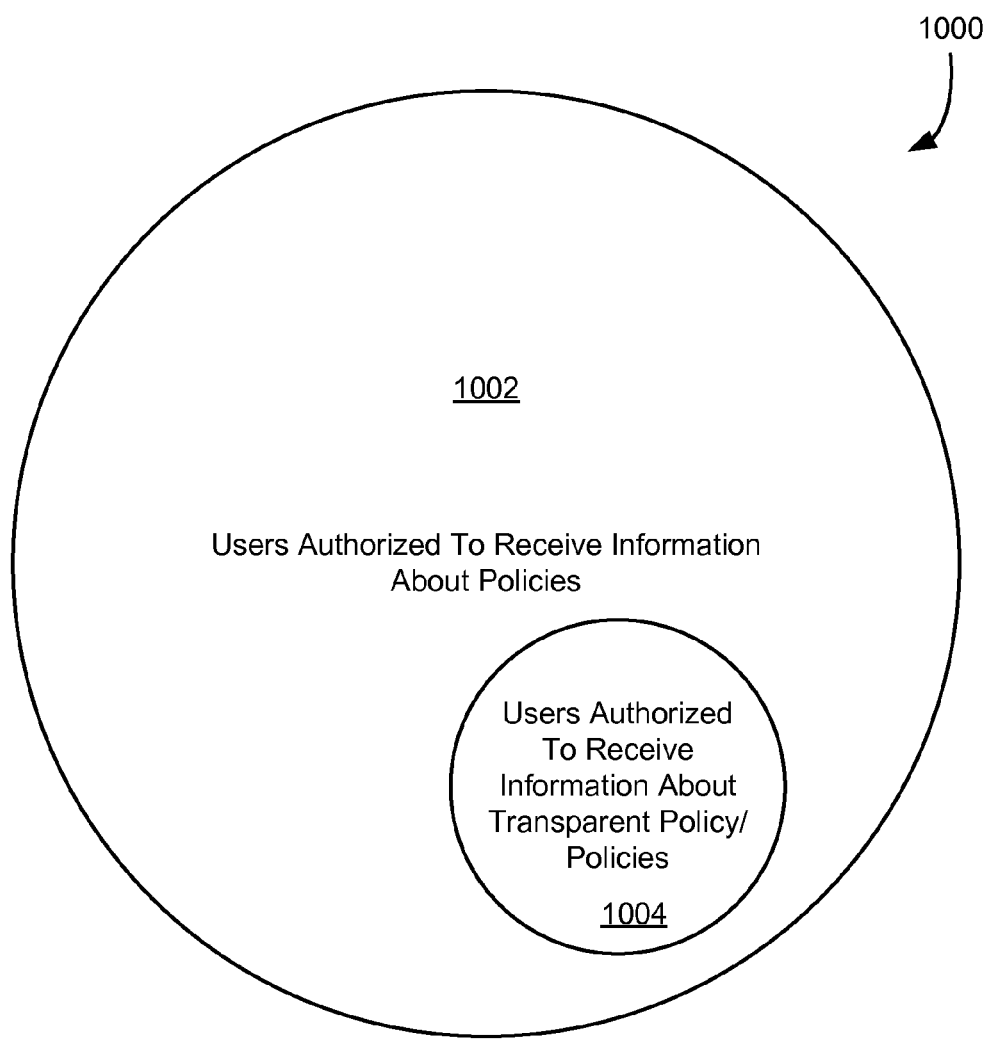
FIG. 10 shows a diagram illustrating various aspects of the present disclosure.

FIG. 10 shows an illustrative example of a diagram 1000 illustrating various aspects of the present disclosure. In this example, the diagram 1000 is in the form of a Venn diagram to illustrate the relationship between various sets. In this example, the diagram 1000 illustrates two sets. A first set, 1002, is a set of users authorized to receive information about policies. The first set of users may comprise, for instance, users authorized to perform at least some management actions in a policy management system. A second set of users, which in this example is a proper subset of the first set 1002, comprises users authorized to receive information about a set of transparent policies (i.e., one or more transparent policies). A transparent policy may be a policy with a visibility restriction associated therewith. In other words, a transparent policy may be a policy with an associated restriction that, when enforced, prevents at least one user from obtaining information about the policy when the user is otherwise authorized to obtain information about one or more other policies either lacking a visibility restriction or having a visibility restriction that does not apply to the user.

It should be noted that the sets illustrated in FIG. 10 may be configured in various ways in accordance with various embodiments. For example, in some embodiments, the sets are customer-wide; that is, regardless of the policies in a policy store, some users are able to receive information about policies, but a subset of those users are authorized to receive information about transparent policies, regardless of how many transparent policies there are within a set of policies. However, the sets may be defined differently. For example, in some embodiments, a single transparent policy may have an associated set of users authorized to obtain information about that policy. The sets of authorized users authorized to obtain information about that policy may vary on a policy-by-policy basis or may otherwise vary among transparent policies. In this manner, a user that may have authorization to obtain information about some transparent policies may still nevertheless lack information to be able to obtain information about other transparent policies. In this manner, for any user, it is possible to implement a transparent policy that that user is unable to obtain information about. As a result, it is possible to utilize a set of policies such that no single user is able to obtain information about the existence of all policies enforced by a system for an entity (e.g., organization and/or customer of a computing resource service provider).

Figure 11:
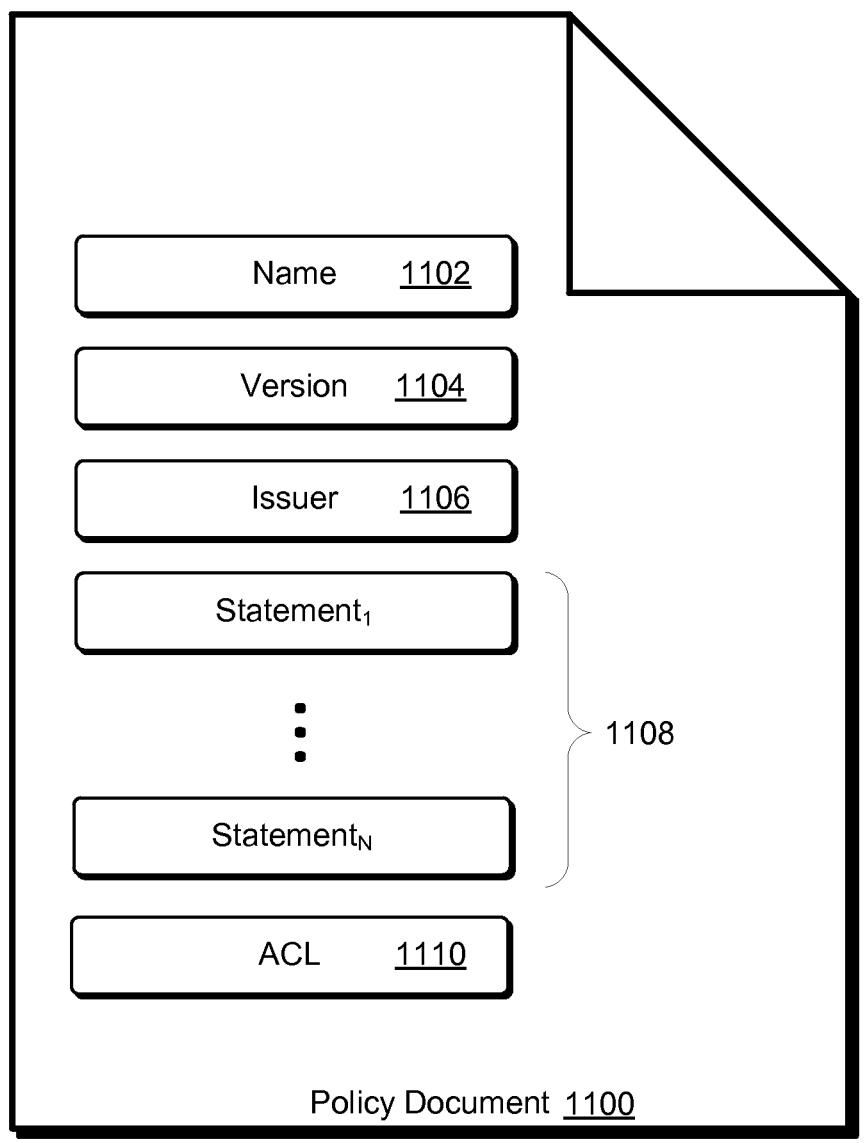
FIG. 11 shows an illustrative example of a policy document in accordance with at least one embodiment.

FIG. 11 shows an illustrative example of a representation of a policy document 1100 in accordance with various embodiments. In this example, the policy document 1100 includes various components, such as a name 1102, version 1104, issuer 1106 and one or more statements 1108, such as described above in connection with FIG. 6. However, in this additional example, the policy document 1100 also includes an access control list (ACL) that is determinative of which users are able to obtain information about a policy encoded by policy document 1100. The access control list 1100 may specify which users are able to obtain information about the policy encoded by the policy document 1100 in various ways in accordance with various embodiments. For example, in some embodiments, the access control list 1110 encodes the identities of users authorized to obtain information about the document. As another example, the access control list 1110 may encode information identifying users not authorized to obtain information about the policy encoded by the policy document 1100.

It should be noted that users may be identified as authorized or unauthorized in various ways in accordance with various embodiments, and various embodiments may utilize multiple ways of identifying users that are authorized or unauthorized for obtaining information about a policy. For example, in some embodiments, users may be identified explicitly by user identifiers such as user names or other identifiers usable to distinguish users from one another. As another example, users may be specified implicitly by characteristics associated with users. As an illustrative example, users may have associated roles within an organization, such as Manager, Vice President, President, Administrator and the like. As a result, users who are authorized or unauthorized for obtaining information about a policy may be specified by the role. In this manner, as the users in an organization change over time, such as through changes in employment status, the access control list 1110 may not require updating in accordance with the changes in the organization. In some examples, other information associated with users may be used to specify who is authorized or unauthorized to obtain information about a policy. As an illustrative example, the access control list 1110 may specify that users associated with code word "alpha" are authorized to obtain information about the policy encoded by the policy document 1100. A database or other mechanism may be maintained to associate user identities with information such as the code words. In this manner, at the time of the valuation of policy, a database query may be submitted to the database to obtain information to determine which users are authorized or unauthorized to obtain information about the policy. As yet another example, policies themselves may be treated as resources and visibility into a policy may be controlled by a policy on one or more other policies, where the policy itself may be a transparent policy.

While an access control list is one mechanism for controlling who has authorization to obtain information about a policy, other mechanisms may be used. For example, one or more access control lists maintained outside of policy documents in association with policy documents (e.g., by a database) may be used to determine which users have authorization to obtain information about policies. Databases and/or other mechanisms storing information determinative about which users are able to obtain information about policies may also be used. Generally, any suitable way by which any information may be maintained where the information is determinative about whether a user has authorization to obtain information about a policy may be used in accordance with various embodiments.

Figure 12:
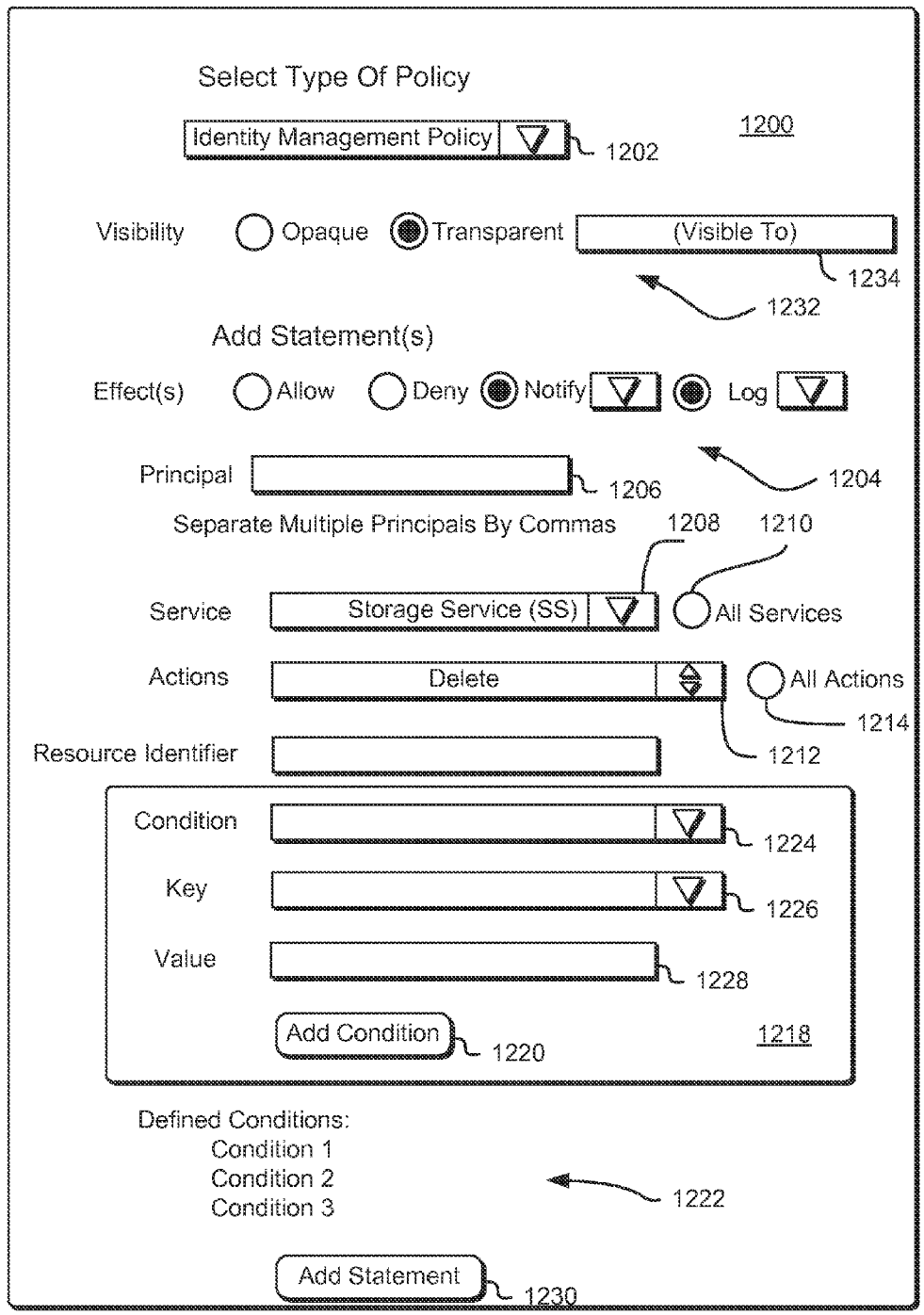
FIG. 12 shows an illustrative example of an interface for authoring policies in accordance with at least one embodiment.

As discussed above, various embodiments of the present disclosure allow users to define custom policies, using attestations of computing environments. The policies may be defined in various ways in accordance with various embodiments as noted above. FIG. 12 shows an illustrative example of a graphical user interface 1200 which may be used to generate a custom policy in accordance with at least one embodiment. The graphical user interface 1200 may be provided to a user in various ways in accordance with various embodiments. In some examples, the graphical user interface 1200 is provided as part of a webpage served from a server of a service provider. A user may interact with user interface elements of the graphical user interface 1200, and information recording at least some of that interaction may be transmitted to the server of the service provider to cause a policy defined in accordance with such interactions to be enforced by the service provider. In some examples, a webpage is coded such that interaction with the user interface elements of the interface 1200 results in a client device generating a policy document that is, upon the user's direction through corresponding user input, transmitted to the service provider. In other embodiments, information about the user's interaction with the interface 1200 is transmitted to the service provider which itself generates a policy document accordingly.

It should be noted that in embodiments where policies are created through the use of webpages or other interfaces provided for display from remote systems, requests to cause the policies to become effective in the service provider environment may be achieved in various ways. In some embodiments, the webpage is coded such that a browser application displaying the interface 1200 transmits an appropriately configured API call to a policy management system in accordance with code of the webpage used to provide the interface 1200. A computer system executing the browser application may, for example, in accordance with the webpage code, generate an API call that is formatted properly and transmit the API call to an appropriate network endpoint. As another example, information generated as a result of interaction with the interface 1200 may be transmitted to a server that served the webpage to provide the interface 1200 or another device operating in concert with the server (e.g., as a service to the server) may transmit an API call to cause the policy to become effective. Other variations are also considered as being within the scope of the present disclosure. In addition, the graphical user interface 1200 may be provided in other ways in accordance with other embodiments. For example, a client-side application may be configured with the interface 1200 or a variation thereof.

As noted, the graphical user interface 1200 may include various interface elements that are usable by a user to define policies. It should be noted that while FIG. 12 shows specific examples of particular types of common graphical user interface elements, information may be received through a graphical interface using different elements and using different techniques than those explicitly illustrated and described. In the current example illustrated in FIG. 12, the graphical user interface 1200 includes a drop-down menu 1202 to enable a user to select a type of policy to be defined using the graphical user interface 1200. In this example an identity management policy is the type currently selected in the drop-down menu 1202. An identity management policy may be applicable to multiple services of a computing resource service provider. An identity management policy may, for instance, be a policy that applies generally to sub-accounts (e.g., user accounts) of a customer account of a computing resource service provider. Other example policy types that may be selectable through the drop-down menu 1202 include policy types that are specific to specific services such as a specific data storage service or other services described above.

As noted above, policies may include information that indicates what should happen when conditions of a policy are fulfilled. In this example, the graphical user interface 1200 includes selectable effect, which, in this illustrative example, are in the form of selectable radio buttons 1204. In this example, the radio buttons 1204 are configured such that only one is selectable, although in some embodiments, multiple effects may be selected simultaneously when such effects are non-conflicting. In this example, the selectable effects are "allow," "deny," "notify," and "log" such that when the policy applies, the effect states whether a request should be processed accordingly. The radio buttons for the "notify" and "log" radio buttons include drop-down menus that provide the user the ability to specify parameters for, respectively, notifications and logging. The drop-down menu for "notify" may, for instance, provide a list of electronic mail addresses and/or identifiers therefor or otherwise provide selectable parameters for transmissions of notifications. The drop-down menu for the "log" radio button may provide identifiers for one or more audit logs. As a result of one or more audit logs being selected, when the policy applies to a request, the request may be logged in the selected one or more audit logs.

Other effects may also be selectable through the graphical user interface 1200 and/or otherwise specifiable for policies (e.g., through a policy language), including but not limited to writing to a specified audit log, transmitting one or more notifications and/or taking one or more user-specified actions which may be in the form of an API call specified through the user interface 1200. In some embodiments, a transparent policy is configurable such that, when the policy applies to a request, false information is provided. For example, if a user submits a request to list or otherwise provide information about a set of policies, as a result of the transparent policy applying, a response to the request may include a list of policies that contains one or more false entries. The false entries may be obtained from a preconfigured set of false entries, from populating one or more policy templates with information about an account associated with the user, with random information, with randomly selected non-random information and/or otherwise. In some embodiments, the effects of a transparent or other policy may be complexly defined. For instance, a policy may be configured with script (e.g., JavaScript or other code composed in a scripting language) or other executable code and, when the policy is triggered, a policy enforcement engine may execute the code. Other variations are also considered as being within the scope of the present disclosure.

In an embodiment, the graphical user interface 1200 includes a text entry field 1206 for specifying one or more principals to whom or which the policy is to be applied. As noted, a principal may be a user, account, service or other entity to which the policy applies. In this example, a user may provide textual input to specify identifiers of principals. As an alternative, the graphical user interface 1200 may allow selection of principals—for example, by obtaining information from a directory of principals. In an embodiment, a wildcard character, e.g., "*" may be used to specify all principals, which may be a default if no specific principal is specified.

As illustrated in FIG. 12, the graphical user interface 1200 in this example includes a drop-down menu 1208 that is usable by a user to select one or more services to which the policy being defined by the graphical user interface 1200 apply. A radio button 1210 allows for simultaneous selection of all applicable services. The services selectable through the drop-down menu 1208 may include, for example, services described above.

It should be noted that the option selectable through the drop-down menu 1208 and therefore selectable through the radio button 1210 may be contextual. In some embodiments, for example, a customer of a competing resource service provider may have resources only utilizing a proper subset of the set of services offered by the service provider. The selectable options 1208 may be limited to those in which the customer has resources hosted by the service provider. As another example, some service providers may require registration with and/or otherwise activation of specific services, and such services may be selectable through the drop-down menu 1208 if such activation has occurred. Other graphical user interface elements may also be contextual in nature and generally the graphical user interface 1200 may be coded such that selection of one or more parameters using a graphical user interface element causes the graphical user interface 1200 to update other user interface elements as appropriate in accordance with the selection.

In the illustrative example of FIG. 12, the graphical user interface includes a menu 1212 that allows for selection of one or more actions. An action specified through the menu 1212 may correspond to a type of action that should be allowed or denied (in accordance with a specified effect, as described above) when policy defined through the interface 1200 applies. As noted, other effects in addition to or alternative to "allow" and "deny" may be available and the actions specifiable through the menu 1212 may be those actions for which the selected effects occur. As with other user interface elements, a radio button 1214 may allow simultaneous selection of all available actions, where the set of actions selectable may be contextual based at least in part on one or more other selections already made. Example actions include, but are not limited to creating (provisioning) a resource (e.g., virtual machine, data object and/or logical data container), deleting a resource, updating a resource, listing resources, modifying a resource, reading a data storage resource (e.g., data object) and the like. Generally, the actions selectable may correspond to API calls that are able to be made through a service of the computing resource service provider.

In an embodiment, the graphical user interface 1200 includes a text entry field 1216 for inputting one or more resource identifiers which may be strings that identify resources hosted by a computing resource service provider that will enforce the policy being created using the interface 1200. A user may cut and paste one or more resource identifiers into the field 1216 or manually type such identifiers to specify resources to which the policy applies. In some embodiments, if no entries are made into the text entry field 1216, or if a wild card character such as a star is inserted, the policy will be interpreted as to apply to all resources associated with the customer for which the policy is being created. Resources may be specified specifically (e.g., with resource identifiers) or generally, such as by specifying a namespace comprising a plurality of resource identifiers. The set of resource identifiers in a namespace may change over time without the need to update policies specifying the namespace.

As illustrated in FIG. 12, the graphical user interface 1200 includes a sub-interface 1218, enabling user to specify conditions for the policy. If one or more conditions of a policy are met, a system enforcing the policy may cause the selected effect(s) to occur. A user may interact with user interface elements of a sub-interface 1218, and upon selection of an add-condition button 1220, a condition defined using the sub-interface 1218 is added to a display 1222 of conditions that have been created. In the illustrative example of FIG. 12, the defined conditions are illustrated as Condition 1, Condition 2 and Condition 3, indicating that a user has already defined three conditions. It should be noted that the display 1222 of the interface 1200 may include information about the conditions that have been defined, such as the parameters (or information based at least in part thereon) that were specified using the sub-interface 1218 to enable a user to quickly view the conditions that he or she has defined for the policy so far. The conditions may be configured in various ways in accordance with various embodiments. For example, in some embodiments, conditions are automatically joined with a default AND operator so that, for the policy to apply, all defined conditions must be satisfied. Similarly, conditions may be automatically joined with an OR operator so that, for the policy to apply, only one condition need be satisfied (although more than one may apply). In some embodiments, the manner by which conditions are joined in a user specified manner (e.g., with some conditions joined with an AND, other conditions joined with an OR, and blocks of joined conditions joined with AND or OR operators, as specified by a user or by default. It should be noted that the term condition refers to both simple conditions (with one operation to check, e.g.) and complex conditions with multiple sub-conditions which themselves may have sub-conditions.

Turning to the specifics of the illustrative example of the sub-interface 1218, as noted, the sub-interface 1218 includes a variety of user interface elements. In this particular example, a drop-down menu 1224 allows a user to select from a plurality of condition values. In an embodiment, the condition values are values selectable for defining operators for conditions. Example condition values are "equals," "not equals," "greater than," "less than," Boolean operators and/or other operators usable to define conditions. In some embodiments, each condition value is associated with a certain data type, such as for binary values, resource identifier values, string values, numeric values, date values, IP address values and the like.

In an embodiment, another drop-down menu 1226 allows for selection of a key, where each of the selectable keys is usable to identify a feature of a request (e.g., information about a request or a parameter of a request). Keys may, for example, represent values that are part of a request. For example, example keys include but are not limited to user agent, source IP address, current time, epic time, whether a request was submitted in accordance with a secure transport protocol, the age of a credential used in multi-factor authentication, a source resource identifier if the request was submitted from another resource such as a computer system hosted by the computing resource service provider, an IP address for an end point of that received request, a protocol used to submit the request and the like. Keys may also be information about a request but not necessarily included with the request, such as a size (e.g., measured in bytes) of a request, a time when the request is received, a protocol by which the request was submitted, a number of data packets comprising the request, a geographic location from which the request was submitted (which may be determined using a service that maps IP addresses to geographic locations), an Internet Service Provider used to transmit the request and the like. Other possible keys include but are not limited to information that may be provided in an attestation provided with a request. Examples include identifiers of platform configuration registers of a TPM. In this manner, for a user to specify that a particular PCR value has a certain value, a user may select a key corresponding to that PCR identifier. A user configuring a policy may, for instance, determine that an authorized application (e.g., application used to submit a request) has executable code that results in a particular hash value when a particular hash function is applied to the code. A user may use the interface 1200 to, for instance, require that a particular PCR value contain the particular hash value. As noted, conditions may be complex and may be based at least in part on multiple PCR values. Further, as noted, embodiments of the present disclosure apply not only to cryptographically verifiable attestations using a TPM or other cryptographic module, but to other types of attestations. Generally, an attestation may be in the form of a structured format and the sub-interface 1218 may be used to define which values in the structured format must satisfy which conditions.

A text entry field 1228 allows for a user to specify a value with a selected key. Thus, if a user wishes to ensure that a request is submitted with an attestation that a particular PCR value is equal to a certain value known to correspond to a valid application, a user may select a key corresponding to an identifier of the particular PCR value of interest and type or otherwise input the PCR value into the value field 1228. Similarly, for a general attestation in a particular structured format, the text entry field 1228 may be used to specify which fields in attestation must satisfy which condition with respect to the value provided in the field 1228. Once the parameters have set using the elements 1224, 1226, 1228, the user may select the add condition button 1220 to cause the condition to find using the sub-interface 1218 to appear in the display 1222 of the graphical user interface 1200. The user may repeat this process for multiple PCR values (or other fields of an attestation), and when finished, may select an add statement button 1230 to add a statement to a policy. Once statements have been added, a policy may be encoded in a policy document and submitted in an API called to a policy management system for the policy to be enforced by a computing resource service provider that utilizes the policy management system.

In an embodiment, the graphical user interface 1300 includes radio buttons 1232 for specifying the visibility of the policy being defined through the graphical user interface 1300. The radio buttons 1232 may be used by a user to specify whether the policy is transparent or opaque, where an opaque policy may be a policy that is not transparent (i.e., a policy for which information is able to be provided to any user authorized to obtain information about policies). If the "transparent" radio button is selected, the user may select a drop-down menu 1234 that allows a user to select (explicitly or implicitly) one or more users authorized to obtain information about the policy. The drop-down menu 1234 may be populated using a directory, such as a directory of users associated with a customer account for which the policy is being defined. In other embodiments, a text entry field appears in addition to or instead of the drop-down menu to allow user input of one or more identifiers of users authorized to obtain information about the policy and/or other information defining a set of users authorized to obtain information about the policy. Other variations of the graphical user interface are also considered as being within the scope of the present disclosure.

Figure 13:
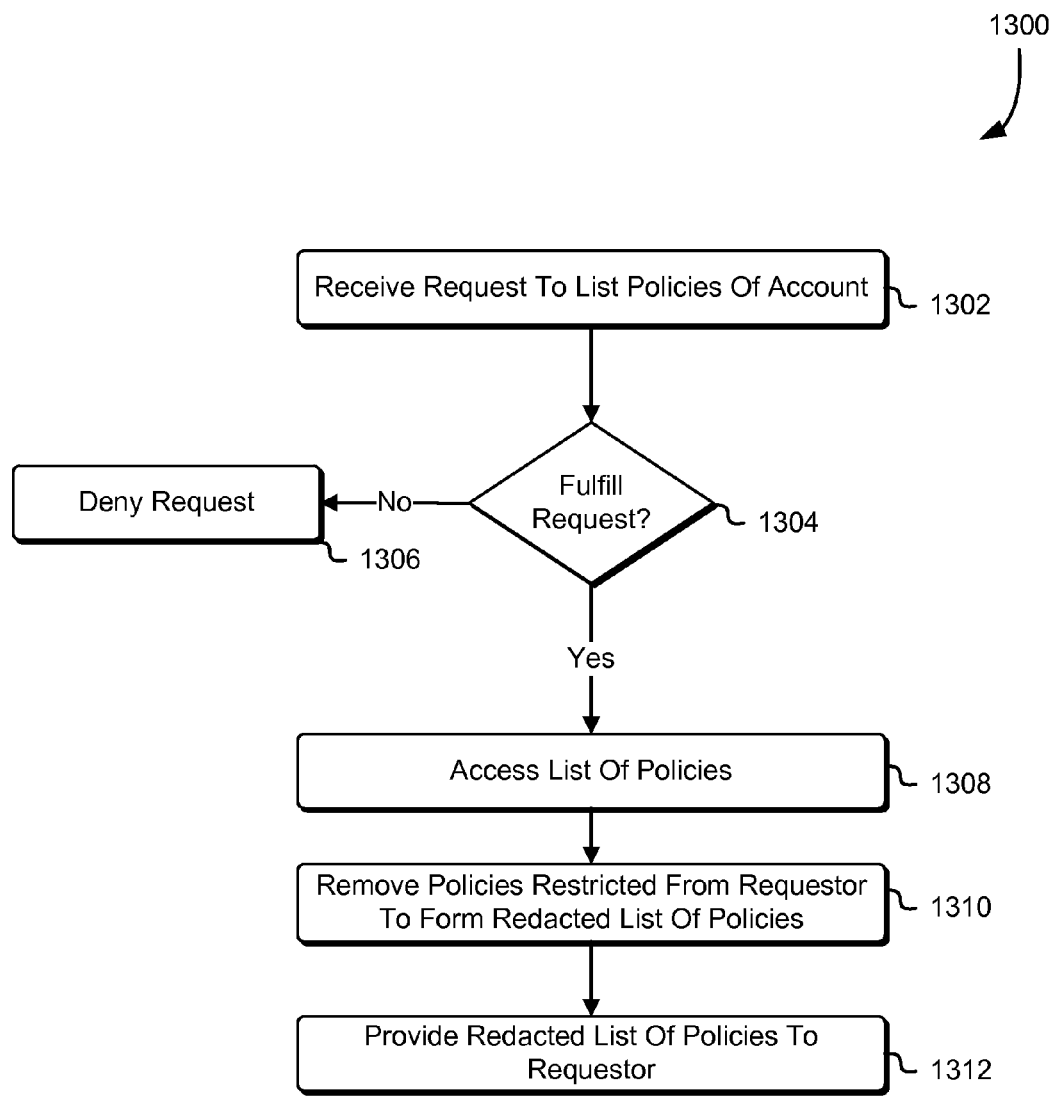
FIG. 13 shows an illustrative example of a process for processing a request in accordance with at least one embodiment.

FIG. 13 shows an illustrative example of a process 1300 for processing a request to obtain a list of policies for an account, such as an account of a computing resource service provider, in accordance with at least one embodiment. The process 1300 may be performed by any suitable system, such as by a policy enforcement system (e.g., service, module) as described above or, generally, any system configured to evaluate policies. As illustrated in FIG. 13, the process 1300 includes receiving 1302 a request to list policies of an account. The request may be, for example, a web service request configured in accordance with an acceptable format to the system performing the process 1300 to cause the system to fulfill the request. Upon receipt 1302 of the request, and the process 1300 may include determining 1304 whether to fulfill the request. As noted above, some users may be authorized to obtain information about policies, while other users may not. As another example, requests may be required to be submitted with proper credentials or other information that is usable to cryptographically verify that the request is authentic and comes from an authorized requestor. As an illustrative example, the request may be received with a digital signature where the request is digitally signed so as to be cryptographically verifiable by the system performing the process 1300 or another system operating therewith. Accordingly, the determination whether to fulfill the request may also include verifying a digital signature of the request to determine whether to fulfill the request.

If determined 1304 not to fulfill the request, the process 1300 may include denying 1306 the request. Denying 1306 the request may be performed in any suitable way, such as by providing a response to the requestor that indicates the denial and that possibly indicates one or more reasons for the denial. Other ways by which a request may be denied may also be used, such as by simply not providing a response to the request and not fulfilling the request. If, however, it is determined 1304 that the request should be fulfilled, the process 1300 may include accessing 1308 a list of policies for the account. Accessing 1308 the list of policies may be performed in various ways and in accordance with various embodiments. For example, in some examples, accessing the list of policies includes submitting a database query to a database that stores information about the policies of the account and receiving a query response with the list of policies. Generally, any way by which a list of policies may be obtained may be used.

Once the list of policies has been accessed 1308, the process 1300 may include removing 1310 policy that is restricted from a requestor to form a redacted list of policies. As an example, one or more access control lists may be accessed and consulted to determine whether the requestor that submitted the request is authorized to view each policy in the list of policies. Once the redacted list of policies has been formed 1310, the process 1300 may include providing 1312 the redacted list of policies to the requestor, such as in a response to the request in accordance with the protocol by which the request was submitted.

It should be noted that the operations and order of operations as illustrated in FIG. 13 are provided for the purpose of illustration and that requests may be processed in different ways in accordance with different embodiments. For example, FIG. 13 shows a process by which a list of policies is accessed, and the list is redacted in accordance with visibility restrictions. Other ways of obtaining a list of policies to return to the requestor in accordance with any applicable visibility restrictions may also be used. For example, a database query configured to obtain a list of policies may be transmitted to a database where the query is configured to result in a query response that only includes policies which the requestor is authorized to obtain information about. Other variations are also considered as being within the scope of the present disclosure.

Figure 14:
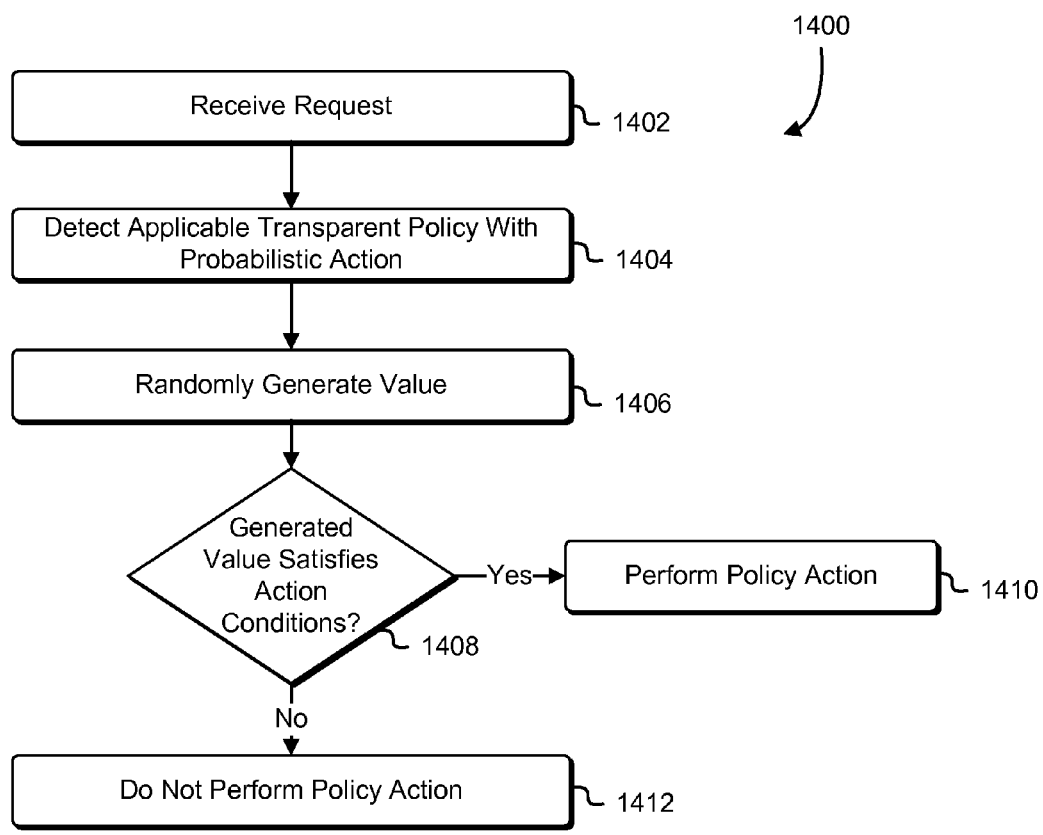
FIG. 14 shows an illustrative example of a process for evaluating a probabilistic action in accordance with at least one embodiment.

As noted above, when policies apply to a request that has been received, various actions may be taken (where the actions may be specified as "effects" of a policy being applicable to a request and should not be confused with "actions" that are the types of actions requested in a request to which policies apply). In some embodiments, the effects of actions that may be taken are not necessarily predetermined. In other words, policies may be defined such that the particular effect of enforcement of the policy is defined non-deterministically. FIG. 14 accordingly shows an illustrative example of a process 1400 which may be used to process requests for which one or more effects of policy application are not predetermined. The process 1400 may be performed by any suitable system, such as by a policy enforcement service or other system that performs policy evaluations, such as described above. In an embodiment, the process 1400 includes receiving 1402 a request, such as described above. The request may be, for example, any request (e.g., web service request) to a computing resource service provider to access one or more resources hosted by the computing resource service provider.

As noted above, when a request is received, a determination may be made whether any policies apply to fulfillment of the request. Accordingly, the process 1400 may include detecting 1404 an applicable transparent policy with a probabilistic action, where a probabilistic action is an action that is taken probabilistically. A probabilistic action in this context may be an action that is not necessarily always taken when the policy applies, but which is taken probabilistically. In other words, the effect of the applicable policy may be the performance of a stochastic process and performing one or more actions depending on the outcome of the stochastic process. For the purpose of illustration, additional operations that may be performed are omitted from FIG. 14, such as detection of other policies that are applicable to the request.

In an embodiment, as a result of detecting 1404 an applicable transparent policy with a probabilistic action, a value may be randomly generated 1406. Thus, in this example, the stochastic process is generation of a random number. The value may be generated, for example, through the use of a suitable random number generator where the term "random number generator" includes number generators which are properly classified as pseudo-random. A determination may be made 1408 whether the generated value satisfies one or more conditions. In some examples, for instance, the randomly generated value may be a positive integer. A condition may be that the generated integer is equivalent to zero modulo, another positive integer. As another example, the randomly generated value may be an alphanumeric string. A condition may be that the alphanumeric string is equivalent to a certain predetermined value, or whether the generated alphanumeric string has one or more particular properties (e.g., has a certain number of identical leading digits).

If it is determined 1408 that the generated value satisfies the action conditions, a policy action may be performed 1410 where the action has been specified in accordance with the various techniques described above. For example, in some instances the policy action is to cause an account of the requestor to be locked. As another example, the policy action may be to transmit a notification. As another example, the policy action may be to lock down a system to deny access until a user with authorization to unlock the system authorizes the system to be unlocked. Generally, the action can be any action specifiable by a user using the techniques described above. If, however, it is determined 1408 that the generated value does not satisfy the action conditions, the process 1400 may include not performing 1412 the policy action.

The process 1400 may be useful in various instances where malicious requests are difficult to distinguish from non-malicious requests. As one example, a user may access documents from a data storage system as part of his or her responsibilities. In the course of a normal day, the user may access a certain number of documents. Each request to access a document may trigger application of a policy with a probabilistic action. The conditions of the policy for performing the action may be configured (e.g., through an interface such as described above and by submitting an API call, as above) such that with normal activities there is a low probability of the action being taken. Thus, a user that performs his or her responsibilities in a normal manner has a low probability of the action being taken such as the user's account becoming locked. The probability may be configured in the policy so that, for instance the expected amount of time before the policy applies is on the order of months. However, if the user accesses an unusually large number of documents the probability that the action will be taken as a result of the applicability of the transparent policy is higher. As a result of the policy discussed in connection with FIG. 14 being a transparent policy, a user that submitted the request may be unaware that the policy caused the particular effect that occurred as a result of the random number satisfying the action conditions. In this manner, it is difficult if not impossible for the user to correlate the effect with the existence of the policy.

As noted, FIG. 14 shows an illustrative example of a process for defining policies with non-deterministic effects, where the effects are determined stochastically at the time of policy evaluation in connection with a received request. The stochastic processes performed may vary in accordance with various embodiments and are not necessarily limited to random number generation. Further, the processes that are performed as a result of a policy being applicable to a request and the probabilities of certain events occurring and the actions that are taken may, in some embodiments, be specifiable through a graphical user interface as described above and/or may be definable using a policy language. Generally, a user may define a policy such that, if the request satisfies conditions of the policy, a stochastic process with N possible outcomes (N a positive integer) possible. The policy may be defined to associate effects with outcomes where there may be more than two possible effects.

As discussed above, numerous variations are considered as being within the scope of the present disclosure. For example, the above techniques describe specific embodiments in connection with transparent policies, that is, policies that have associated restrictions on users who are able to obtain information about the existence of the policies. Various techniques may be employed in connection with such policies. For example, in some embodiments restrictions are placed on users who are able to author such policies. In some examples, for instance, a set of users may have an account trustee. For example, a customer of a competing resource service provider may have one or more account trustees associated with the account. The account trustee may have privileges that make the trustee an omniscient observer for the customer account. Thus, an account trustee may be a user that is able to author transparent policies and that is able to obtain information about the transparent policies. As noted above, however, restrictions on visibility to policies may be enacted on a policy-by-policy basis and in some embodiments an account trustee may not have authorization to obtain information about all transparent policies and there may be multiple account trustees, each of whom is unable to obtain information about all policies for the account. In some examples, policies may be stored in a data storage system within a particular name space utilized by the data storage system where access to the name space is restricted by policy. Thus, only users with access to data stored in a particular name space may be able to obtain information about the policy stored therein. Name spaces may be overlaid to provide different levels of access.

Other techniques which may be used in connection with transparent policies include policy conditions which are stateful. For example, in various embodiments, policy conditions are stateless. That is, whether or not a policy applies to a request is not dependent on any previous requests that have been received. However, policies may be applied statefully and a policy management system may track requests or other account activity in order to enact stateful application of policies. As an illustrative example, a policy may apply to request to access data from a data storage system. Whether or not the policy applies for any particular request may depend on the amount of data previously received within a specified amount of time. The amount of data may be measured in various ways, such as request frequency, number of documents, size of data and the like. Stateless techniques for defining transparent policies may also be used. For example, individual requests for more than a specified number of documents may trigger a transparent policy. As another example, responses to requests may be analyzed and features of the response (e.g., size, number of documents, number of database records, etc.) may be used to determine whether a transparent policy applies. As with all variations discussed herein, graphical user interfaces and APIs may be modified accordingly to support such features.

As another example of a variation considered as being within the scope of the present disclosure, the application of policies may utilize conditions around the time of day. Such transparent policies, for example, may be defined to be inapplicable during specified business hours of an organization, but to be applicable to requests made outside of normal business hours. Further, in some examples, policies are modifiable only by those users authorized to obtain information about the existence of the transparent policies. As yet another example of a variation considered as being within the scope of the present disclosure, whether a transparent policy applies to a particular request may depend on whether the particular request is transmitted from an authorized computer system. As an example, techniques described in U.S. application Ser. No. 14/225,249, which is incorporated herein by reference, may be used in the authoring of policies and valuation thereof. Request may be, for example, submitted with attestations to a computing environment from which the request was submitted. If determined that an attestation provided with a request is sufficient, a transparent policy may not be triggered, whereas if a request is submitted without a valid attestation, the policy may be triggered and, for example, the request may be logged and/or other actions may be taken in accordance with the policy. Other variations are also considered as being within the scope of the present disclosure.

Figure 15:
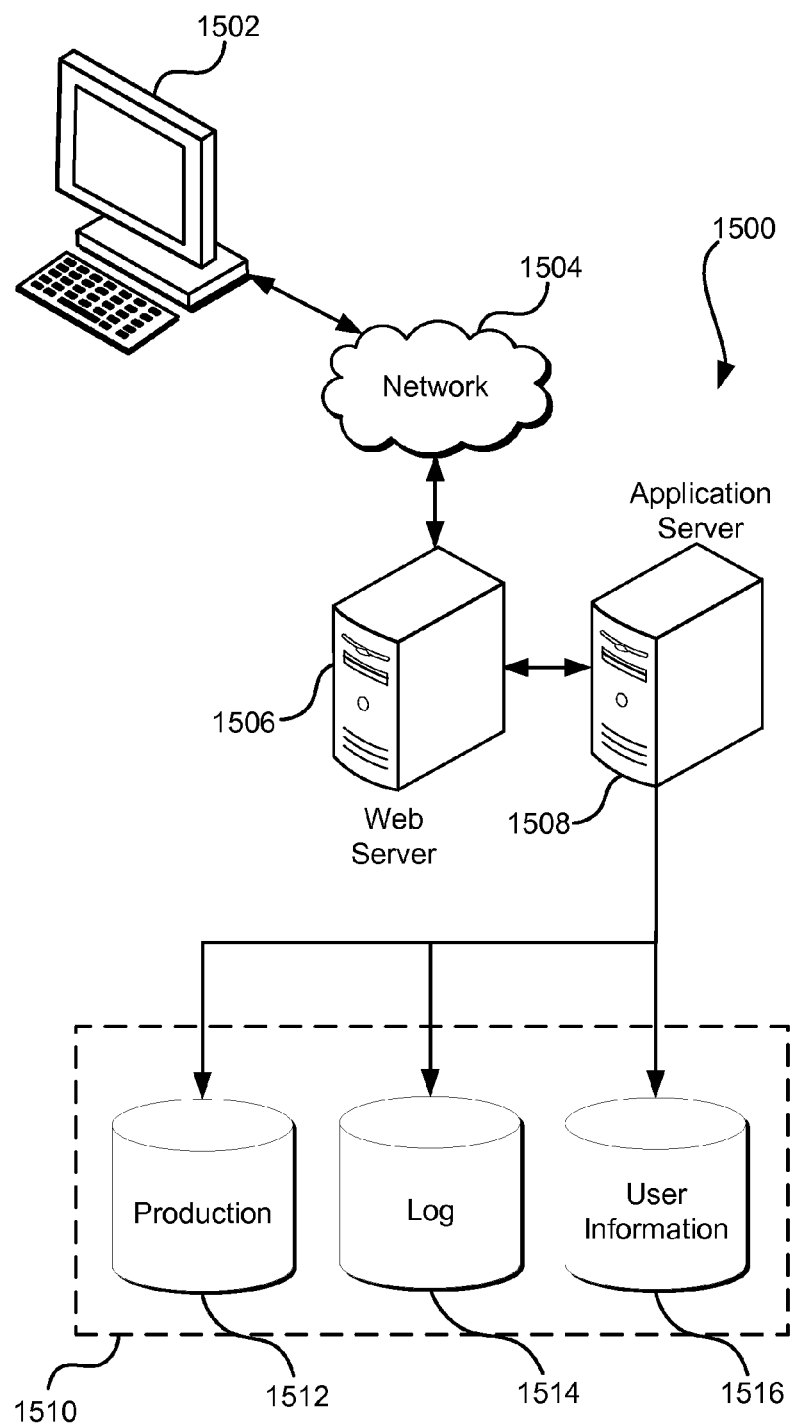
FIG. 15 illustrates an environment in which various embodiments can be implemented.

FIG. 15 illustrates aspects of an example environment 1500 for implementing aspects in accordance with various embodiments. As will be appreciated, although a web-based environment is used for purposes of explanation, different environments may be used, as appropriate, to implement various embodiments. The environment includes an electronic client device 1502, which can include any appropriate device operable to send and/or receive requests, messages or information over an appropriate network 1504 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1502 and the application server 1508, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1510 can include several separate data tables, databases, data documents, dynamic data storage schemes and/or other data storage mechanisms and media for storing data relating to a particular aspect of the present disclosure. For example, the data store illustrated may include mechanisms for storing production data 1512 and user information 1516, which can be used to serve content for the production side. The data store also is shown to include a mechanism for storing log data 1514, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. The application server 1508 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1502. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments further can be implemented in a wide variety of operating environments, which in some cases can include one or more user computers, computing devices or processing devices, which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    enforcing a set of policies for an account, the set of policies configured such that fulfillment of requests submitted by an administrator of the account requires compliance with at least a first policy in a first subset of the set of policies and a second policy in a second subset of the set of policies;
    receiving, from the administrator associated with the account, a request for information about the set of policies enforced for the account, the set of policies indicating conditions for access to computing resources;
    obtaining information responsive to the request, the information responsive to the request comprising information about the first subset of the set of policies and excluding information about the second subset of the set of policies as a result of the administrator lacking authorization for obtaining information about policies in the second subset of the set of policies; and
    providing to the administrator, a response to the request that comprises the information responsive to the request, the response lacking any information indicative of existence of the second subset of the set of policies.

2. The computer-implemented method of claim 1, wherein:
    the one or more systems are hosted by a service provider;
    the account is from a plurality of accounts, each corresponding to a different customer of the service provider; and
    the set of policies is from a plurality of sets of policies enforced by the service provider, each with a corresponding customer of the service provider.

3. The computer-implemented method of claim 1, wherein:
    the method further comprises:
        receiving an application programming interface request comprising information defining a policy; and
        processing the application programming interface request by at least adding the policy to the set of policies; and
    after adding the policy to the set of the set of policies, the policy is a member of the second subset of the set of policies.

4. The computer-implemented method of claim 3, wherein the application programming interface request further comprises information that distinguishes one or more users that are authorized for obtaining information about the policy from one or more other users that are unauthorized for obtaining information about the policy.

5. The computer-implemented method of claim 1, wherein:
    at least one policy of the second subset of the set of policies, when applicable to a request, causes information about the request to be written to an audit log; and
    the method further comprises writing to the audit log as a result of the at least one policy applying to a particular request.

6. The computer-implemented method of claim 5, wherein, as a result of the administrator lacking authorization to obtain authorization for obtaining information about policies in the second subset of the set of policies, the administrator lacks authorization for obtaining information about the audit log.

7. A system, comprising at least one computing device configured to implement one or more services, the at least one computing device including microprocessor and a memory, the one or more services:
for an entity, maintain information about policies enforced for the entity;
provide an interface through which requests are submitted to allow a user to obtain information about the policies, the policies indicating conditions for access to computing resources; and
process requests submitted through the provided interface such that, for at least a first user and a second user requesting the same information about the policies during a time when the policies remain unchanged, the first user is provided first information about the policies that is different than second information about the policies provided to the second user, the first information indicating existence of one or more policies for which the second information lacks an indication of existence of the one or more policies.

8. The system of claim 7, wherein the one or more services comprise a service configured to receive requests to access computing resources and enforce the policies in connection with the received requests to access the computing resources.

9. The system of claim 8, wherein:
the first information indicates existence of a first policy;
the second information lacks an indication of existence of the first policy; and
the service is further configured to respond to requests, whose fulfillment is disallowed by the first policy, without fulfilling the requests and without indicating that the requests are denied.

10. The system of claim 7, wherein the one or more policies comprise at least one policy configured to apply to requests by the second user to access a computing resource.

11. The system of claim 7, wherein the one or more policies comprise at least one policy configured to apply to requests by the second user and, when applicable to the requests, cause the requests by the second user to be logged.

12. The system of claim 7, wherein
the one or more policies comprise at least one policy configured to apply to requests by the second user and, when applicable to the requests, cause the system to probabilistically make a determination whether to perform an action and, when the determination indicates that the action is to be taken, cause the action to be taken.

13. The system of claim 7, wherein the second information comprises false information about the policies.

14. The system of claim 7, wherein the system is further configured to enforce a restriction on an ability of the second user to modify the one or more policies.

15. The system of claim 7, wherein the access to the computing resources is via application programming interface calls.

16. A non-transitory computer-readable storage medium having collectively stored thereon executable instructions that, if executed by one or more processors of a computer system, the computer system including a microprocessor and a memory, cause the computer system to at least:
receive, from a requestor, a request whose fulfillment involves providing information to the requestor about a set of policies indicating conditions for access to computing resources associated with an entity, the policies applied to requests submitted to a system and enforced such that, fulfillment of the requests is dependent on compliance with the policies;
obtain information responsive to the request, the information responsive to the request comprising information about a first subset of the set of policies and excluding information about a second subset of the set of policies as a result of the requestor lacking authorization for obtaining information about policies in the second subset of the set of policies; and
provide, to the requestor, a response to the request based at least in part on the information responsive to the request.

17. The non-transitory computer-readable storage medium of claim 16, wherein the response lacks information indicating existence of at least one policy in the second subset of the set of policies.

18. The non-transitory computer-readable storage medium of claim 16, wherein at least one policy in the second subset of the set of policies applies to requests made by the requestor.

19. The non-transitory computer-readable storage medium of claim 16, wherein:
one or more policies of the second subset of the set of policies has an associated restriction on users able to obtain information about the policy, the associated restriction defined at least in part on an attribute applicable to multiple users; and
the information responsive to the request excludes the information about the second subset of the set of policies as a result of the requestor being associated with the attribute.

20. The non-transitory computer-readable storage medium of claim 16, wherein:
the instructions further include instructions that, when executed by the one or more processors, cause the computer system to enforce a policy from the second set of policies by at least allowing fulfillment of a second request from the requestor to which the policy applies and causing at least one operation specified by the policy to be performed; and
the at least one operation is performed without indicating to the requestor that the at least one operation was performed.

21. The non-transitory computer-readable storage medium of claim 16, wherein the at least one operation includes causing data to be stored in a manner inaccessible to the requestor.

22. The non-transitory computer-readable storage medium of claim 16, wherein at least one policy in the second subset of the set of policies applies to requests made by the requestor and, when applicable to the requests, cause the requests by the requestor to be logged.

* * * * *